(12) United States Patent
Lee

(10) Patent No.: US 10,232,827 B2
(45) Date of Patent: Mar. 19, 2019

(54) HYBRID BLADE

(71) Applicant: ALBEREE PRODUCTS, INC., Halethorpe, MD (US)

(72) Inventor: Albert Lee, Halethorpe, MD (US)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 187 days.

(21) Appl. No.: 14/868,065

(22) Filed: Sep. 28, 2015

(65) Prior Publication Data

US 2016/0016552 A1 Jan. 21, 2016

Related U.S. Application Data

(63) Continuation of application No. 14/021,991, filed on Sep. 9, 2013, now Pat. No. 9,145,111.

(Continued)

(51) Int. Cl.
*B60S 1/40* (2006.01)
*B60S 1/38* (2006.01)
*B60S 1/34* (2006.01)

(52) U.S. Cl.
CPC ......... *B60S 1/4003* (2013.01); *B60S 1/3425* (2013.01); *B60S 1/38* (2013.01); *B60S 1/3801* (2013.01); *B60S 1/4009* (2013.01); *B60S 1/4045* (2013.01); *B60S 1/4048* (2013.01); *B60S 1/4038* (2013.01); *B60S 1/4067* (2013.01); *B60S 1/4087* (2013.01); *B60S 2001/3815* (2013.01);

(Continued)

(58) Field of Classification Search
CPC .... B60S 1/4003; B60S 1/4045; B60S 1/4048; B60S 2001/4058; B60S 2001/4061; B60S 1/4009; B60S 1/4016; B60S 1/4035; B60S 1/4022; B60S 1/40; B60S 2001/4035; B60S 2001/4022; B60S 1/3429; B60S 1/4038; B60S 1/4083; B60S 1/4067

See application file for complete search history.

(56) References Cited

U.S. PATENT DOCUMENTS 1,573,618 A * 2/1926 Laganke .................. B60S 1/14
 15/245
3,003,174 A 10/1961 Anderson (Continued)

FOREIGN PATENT DOCUMENTS

DE 202012102614 * 10/2012
EP 0 461 987 B1 4/1996

(Continued)

OTHER PUBLICATIONS

Machine translation of description portion of German publication 202012102614, published Oct. 2012.*

*Primary Examiner* — Gary K. Graham
(74) *Attorney, Agent, or Firm* — Birch, Stewart, Kolasch & Birch, LLP

(57) ABSTRACT

A windshield wiper blade including a primary part having an elongated main body and an interior space formed in the main body, and at least two secondary parts is provided. Each secondary part has a first end and a second end, the first end being received into the interior space of the main body, and the second end being exposed, wherein the secondary parts are hingedly connected to the primary part to swivel relative to the primary part to accommodate a changing curvature of a surface of a windshield based on pressure applied thereto against the windshield.

7 Claims, 22 Drawing Sheets

Related U.S. Application Data

(60) Provisional application No. 61/698,914, filed on Sep. 10, 2012.

(52) U.S. Cl.
CPC ............... *B60S 2001/3818* (2013.01); *B60S 2001/3822* (2013.01); *B60S 2001/4022* (2013.01); *B60S 2001/4032* (2013.01); *B60S 2001/4035* (2013.01); *B60S 2001/4058* (2013.01)

(56) References Cited

U.S. PATENT DOCUMENTS

| | | | |
|---|---|---|---|
| 3,107,384 | A | 10/1963 | Wise |
| 3,419,932 | A | 1/1969 | Linker |
| 4,793,020 | A | 12/1988 | Stratton et al. |
| 5,661,871 | A | 9/1997 | Scorsiroli |
| 7,523,522 | B2 | 4/2009 | Herring et al. |
| 8,381,349 | B2 | 2/2013 | Ku |
| 8,510,898 | B2 | 8/2013 | Ku |
| 2005/0086759 | A1 | 4/2005 | Torii et al. |
| 2010/0005609 | A1* | 1/2010 | Kim ................. B60S 1/387 15/250.32 |
| 2011/0131750 | A1 | 6/2011 | Kwon et al. |
| 2011/0265280 | A1 | 11/2011 | Westermann et al. |
| 2011/0277266 | A1 | 11/2011 | Umeno |
| 2012/0047673 | A1* | 3/2012 | Depondt ............ B60S 1/387 15/250.32 |
| 2012/0144615 | A1* | 6/2012 | Song ............... B60S 1/4003 15/250.32 |
| 2012/0159733 | A1 | 6/2012 | Kwon |
| 2012/0180245 | A1 | 7/2012 | Ku |
| 2012/0180247 | A1 | 7/2012 | Ku |
| 2012/0227206 | A1* | 9/2012 | Depondt ............ B60S 1/387 15/250.32 |
| 2013/0104334 | A1* | 5/2013 | Depondt ............ B60S 1/387 15/250.32 |
| 2013/0125333 | A1 | 5/2013 | Tolentino et al. |

FOREIGN PATENT DOCUMENTS

| | | |
|---|---|---|
| EP | 0 695 246 B1 | 7/1997 |
| EP | 0 849 133 A1 | 6/1998 |
| EP | 1 201 516 A2 | 5/2002 |
| WO | 2011032753 * | 3/2011 |
| WO | 2012001175 * | 1/2012 |

* cited by examiner

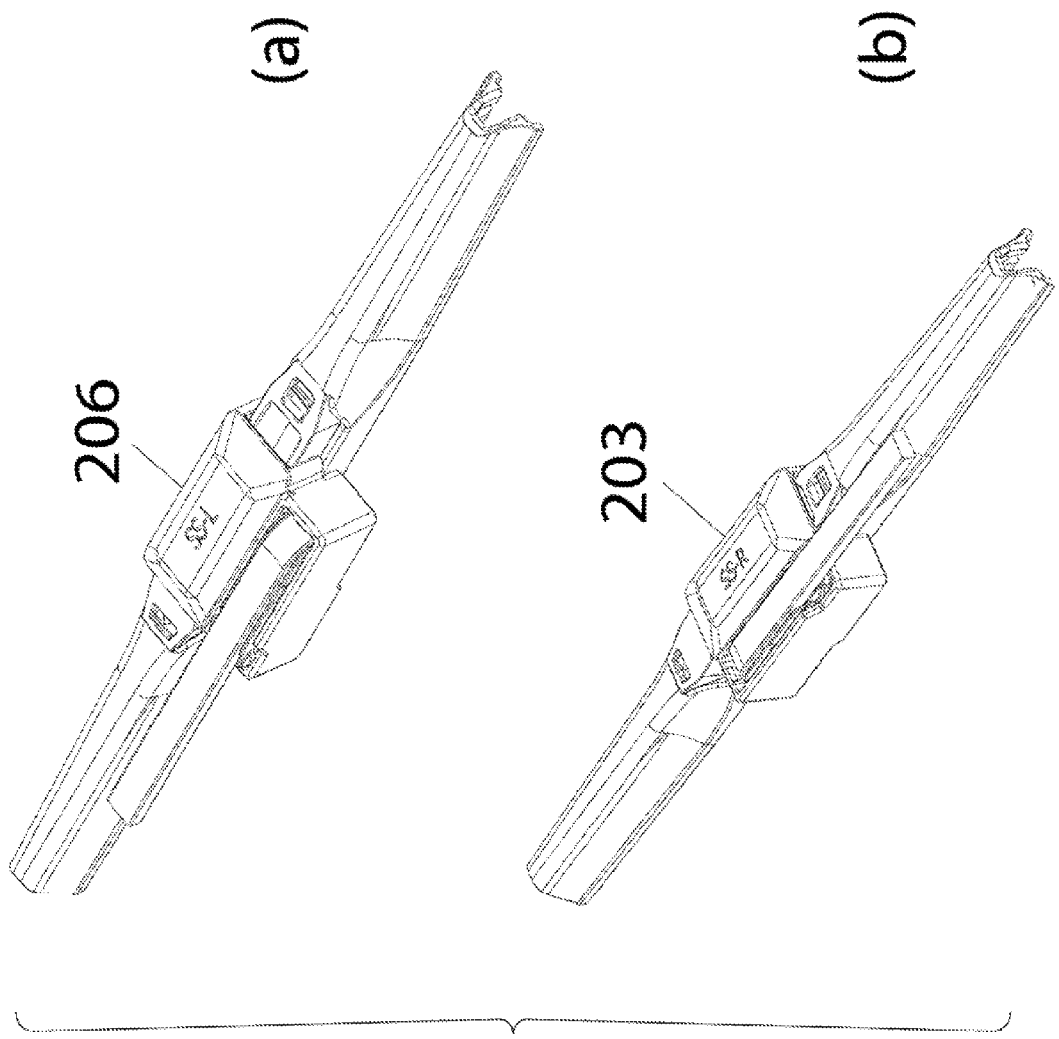

HYBRID BLADE

CROSS REFERENCE TO RELATED APPLICATION

This application is a continuation application of U.S. application Ser. No. 14/021,991, filed Sep. 9, 2013, which claims the benefit of U.S. Provisional Application No. 61/698,914 filed on Sep. 10, 2012, the disclosures of which are incorporated by reference in their entireties.

BACKGROUND OF THE INVENTION

Field of the Invention

Embodiments of the invention are directed generally to windshield wiper blades usable with various wiper arms. More particularly, the embodiments of the invention are directed to windshield wiper blades having segmented portions.

Description of the Related Art

Various types of windshield wiper blades are available which utilize respective adapters for connection of windshield wiper blades to various wiper arms of automobiles. Thus, a particular arm may be connectable to windshield wiper blades using the adapters. Efforts have been made in development of windshield wiper blades that provide consistent wiping regardless of the developing type of arm that the windshield wiper blade is attached to.

SUMMARY OF THE INVENTION

According to an embodiment of the invention, a windshield wiper blade includes a primary part having an elongated main body and an interior space formed in the main body and at least two secondary parts. Each secondary part has a first end and a second end, the first end being received into the interior space of the main body, and the second end being exposed, wherein the secondary parts are hingedly connected to the primary part to swivel relative to the primary part to accommodate a changing curvature of a surface of a windshield based on pressure applied thereto against the windshield.

The windshield wiper blade may further include a wiping element support track having a first holder on an upper part and a second holder on a lower part, an elastic element seated within the first holder of the wiping element support track, and a wiping element seated within the second holder of the wiping element support track.

The primary part may include a main claw to receive the wiping element support track, and each secondary part includes at least one claw at one end to receive the wiping element support track.

Each secondary part includes a first end having a first claw to receive a respective end of the wiping element support track and a second end having a second claw to receive a respective intermediate portion of the wiping element support track.

The primary part may include an attachment part for connection to a windshield arm.

The attachment part may be detachably mounted to the primary part.

The primary part may have a space to receive the attachment part.

Each secondary part may further include a hidden section that includes the first end to be received into the interior space of the primary part, an exposed section that includes the second end, and is connected to the hidden section, and an opening formed at the second end of the exposed section.

The exposed section may form a part of an outer shell of the windshield wiper blade.

The windshield wiper blade may further include an end stop that includes a head and a body, the head and the body being perpendicular to each other, wherein the opening is formed vertically through the second end of the secondary part from a top to a bottom thereof, and has a corresponding cross sectional shape as the end stop.

Each of the secondary parts may include a hinge, and the primary part may include a receiver corresponding to each hinge in the interior space.

Each hinge may be disposed transversely to each secondary part.

The windshield wiper blade may further include a recess formed on an intermediate portion of the main body and an insert received in the recess.

The recess may include a notch and a lock configured to secure the insert, the insert including a first end that is received in the notch and a second end that is pressed against the lock.

The recess may have a bottom portion that is flat, and respective curved portions at the notch and the lock.

Curvatures of the curved portions may be convex.

The lock may include a slender body that extends from the bottom portion upward, and may be configured to receive an end of the insert so that, when the insert is engaged to both the notch and the lock, the insert is retained in the recess securely.

The insert may include a hollow interior to receive an adapter.

The insert may include a base configured to extend parallel to the recess when mounted in the recess, a holder extending perpendicularly to the base, a hinge disposed at an intermediate portion of the holder, and rises that match curvatures of the curved portion of the recess.

The windshield wiper blade may further include an adapter configured to be connected to the insert at the hinge, the adapter including a body including a head at one end and a tail at an opposite end, a cap having a hollow interior to receive the head of the body, and configured to swivel with respect to the body, and a sleeve configured to receive the tail of the body, and configured to be detachable from the body.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 22 shows views of a windshield wiper blade with an adapter, a side adapter and their assembly in right-side and left-side driving configurations.

DETAILED DESCRIPTION OF THE EMBODIMENTS

Reference will now be made in detail to embodiments of the invention, examples of which are illustrated in the accompanying drawings. This invention may, however, be embodied in many different forms and should not be construed as limited to the embodiments set forth herein. Wherever possible, the same reference numbers will be used throughout the drawings to refer to the same or like parts. Example embodiments of the invention will be described with reference to FIGS. 1 to 22 of the drawings.

Figure 1:
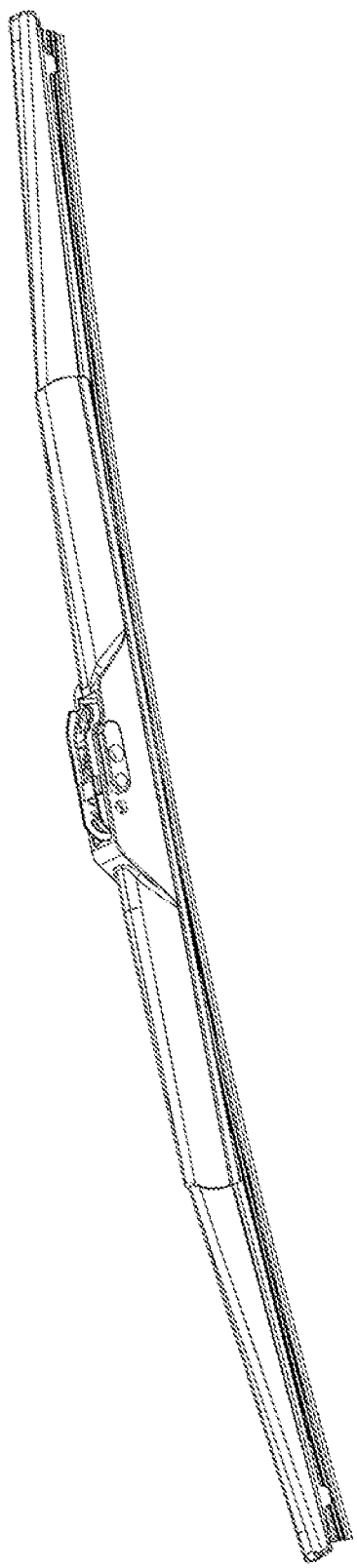
FIG. 1 shows a perspective view of a windshield wiper blade according to one embodiment of the invention.
Figure 2:
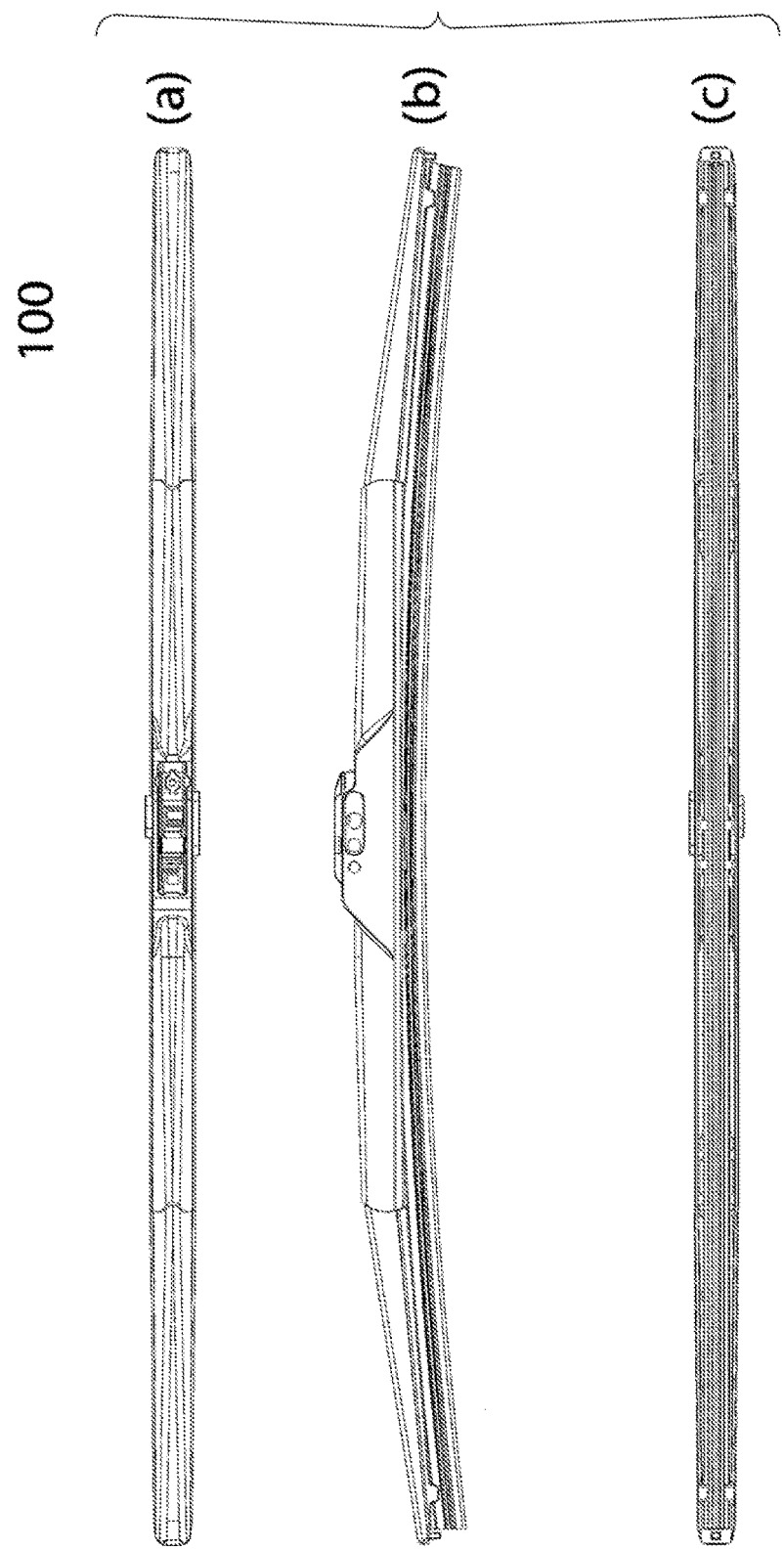
FIG. 2 shows top, side and bottom views of a windshield wiper blade according to one embodiment of the invention.
Figure 3:
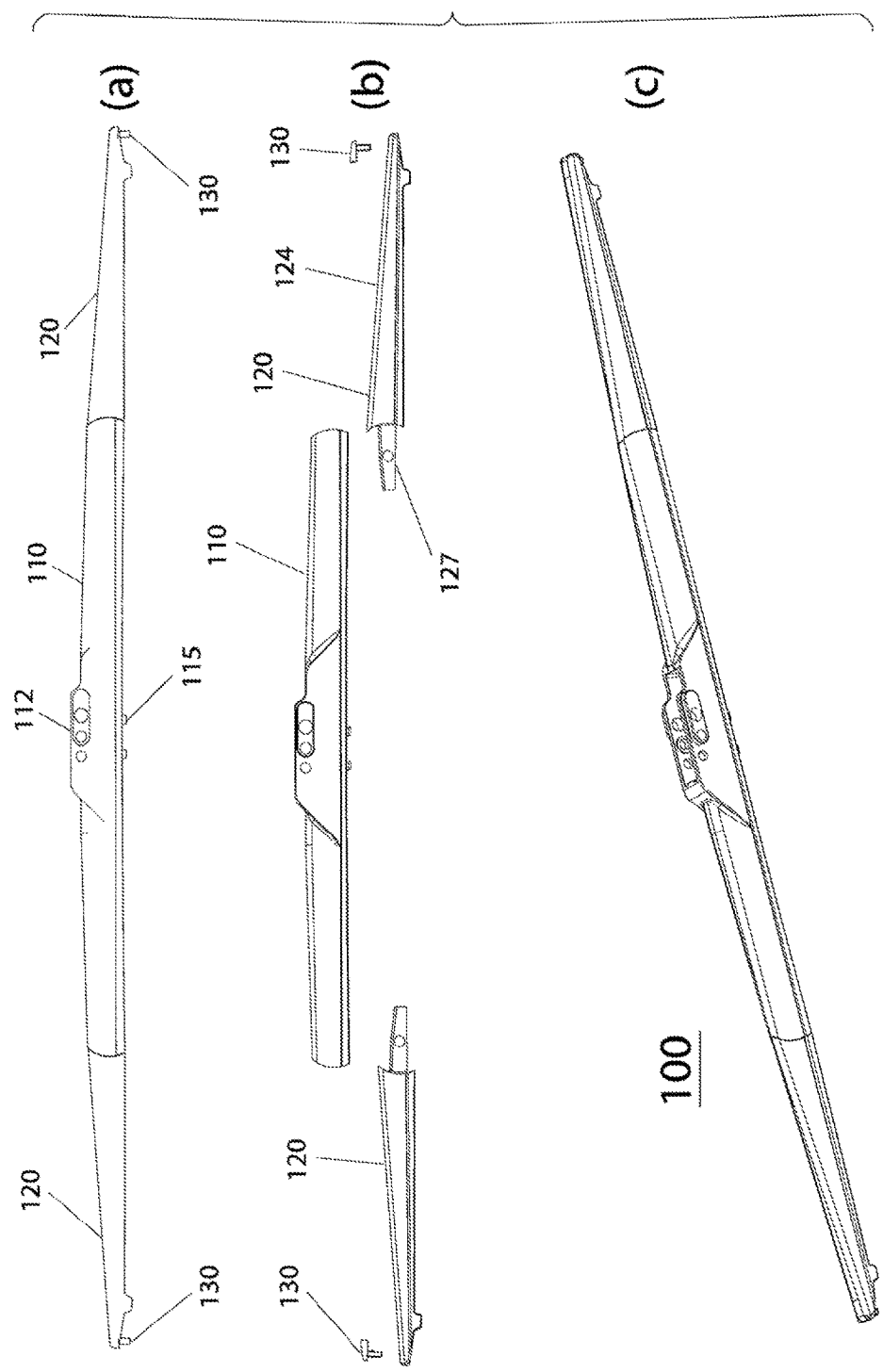
FIG. 3 shows a partially exploded view of a windshield wiper blade according to one embodiment of the invention.

In FIG. 1, shown is a windshield wiper blade 100 (also referred to as a hybrid blade 100) according to an embodiment of the invention. FIG. 2 shows the hybrid blade of FIG. 1 in various views, namely, (a) of FIG. 2 is a top view of the hybrid blade 100 according to an embodiment of the invention, (b) of FIG. 2 is a side elevational view of the hybrid blade 100 according to an embodiment of the invention, and (c) of FIG. 2 is a bottom view of the hybrid blade 100 according to an embodiment of the invention. FIG. 3 shows a partially exploded view of the hybrid blade 100 according to one embodiment of the invention, whereby (a) of FIG. 3 shows the hybrid blade 100 in an assembled configuration, (b) of FIG. 3 shows the hybrid blade in a partially exploded configuration, and (c) of FIG. 3 shows a side perspective view of the hybrid blade in the assembled configuration.

As shown in (a) and (b) of FIG. 3, the hybrid blade 100 includes an outer shell having a plurality of parts. In various embodiments of the invention, at least three parts are present, namely, a primary part 110, at least two secondary parts 120, and at least two end stops 130, but in other embodiments, the number of primary and secondary parts, as well as end stops may vary. Also shown in (a) of FIG. 3 is at least one main claw 115 formed on the primary part 110. The at least one main claw 115 is formed opposite an attachment 112 of the primary part 110. The primary part 110 is formed as an elongated body. In this embodiment of the invention, a stump portion 127 is present in each of the at least two secondary parts 120 for connection to the primary part 110. The stump portion 127 is received into an interior of the primary part 110 and hingedly connected to the primary part. Further, the stump portion 127 is shorter than an exposed portion 124 of the secondary part 120. The hybrid blade 100 includes a blade assembly, which will be described with respect to variations of the hybrid blade 100 shown in FIGS. 4-9.

Figure 4:
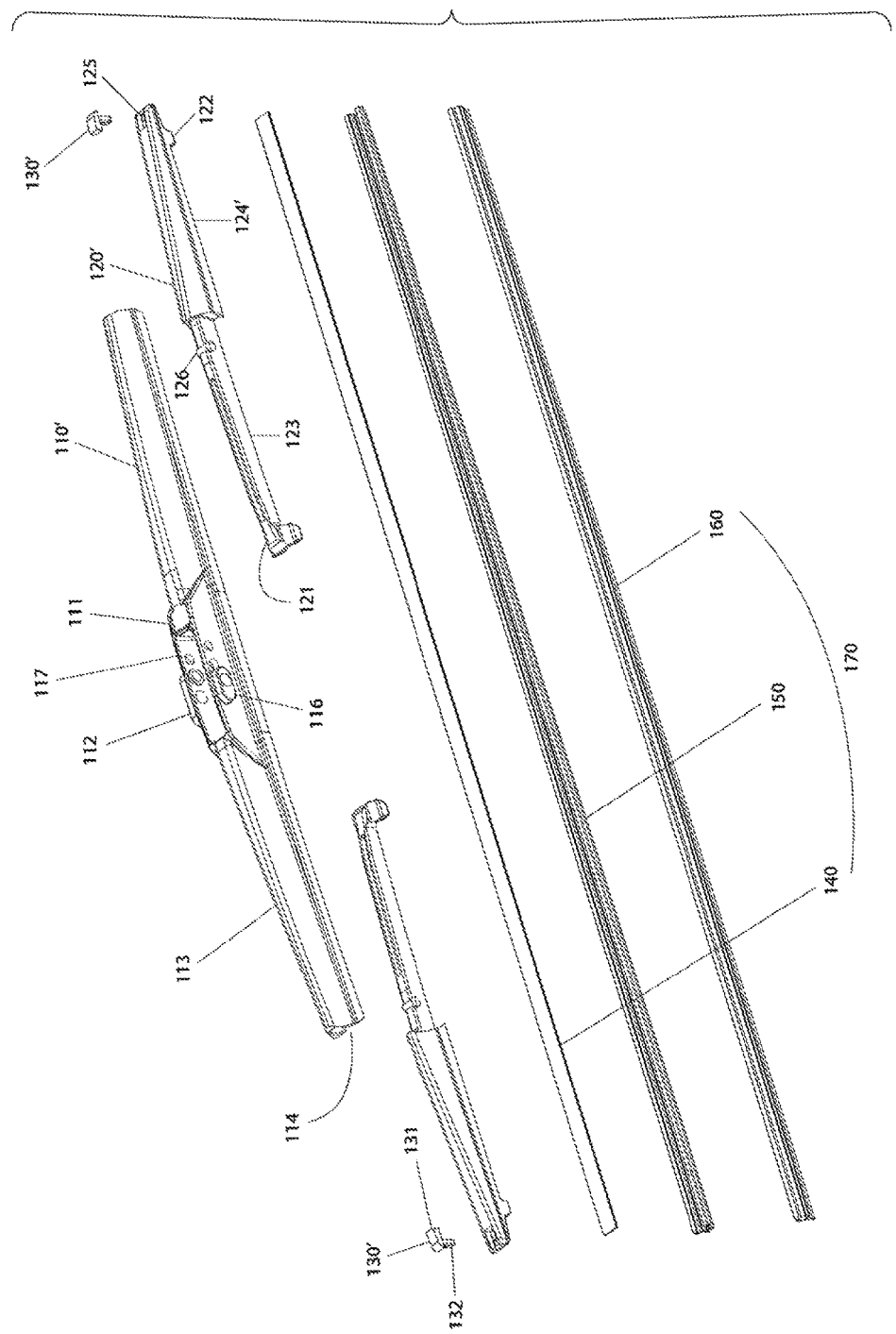
FIG. 4 shows a perspective exploded view of a windshield wiper blade according to one embodiment of the invention.

FIG. 4 shows a perspective exploded view of the hybrid blade 100' according to one embodiment of the invention. As shown in FIG. 4, the hybrid blade 100' further includes a blade portion 170 having an elastic element 140, a wiping element support track 150 and a wiping element 160. Details of the elastic element 140, the wiping element support track 150 and the wiping element 160 will be discussed below.

The primary part 110' has a generally triangular outline, in cross section, and has two ends, each of which receives a secondary part 120'. The primary part 110' further includes the attachment 112' and an outer shell 113. The attachment 112' is used to connect the hybrid blade 100' to an arm of a wiper. An adapter may be received or attached to the attachment 112' to enable a connection of the arm to the primary part 110'. The attachment 112' is shown with various apertures and protrusions which enable the connection of the arm to the primary part 110'. A protrusion 111 is formed as part of the attachment 112'.

Further, as shown in FIG. 4, in this embodiment of the invention, each secondary part 120' has at least two claws 121 and 122, one positioned at each end of each secondary part 120'. Each secondary part 120' also includes a hidden section 123 and an exposed section 124', as well as an opening 125 formed at an end of the exposed section 124' near the claw 122. The hidden section 123 is configured to be received into a portion of the primary part 110', namely, cavities 114, and the exposed section 124' is configured to form a part of the outer shell of the hybrid blade 100'. As shown in FIG. 4, the hidden section 123 and the exposed section 124' have comparable lengths. In the embodiment shown in FIG. 4, the primary part 110 does not have a main claw 115. Thus, in the embodiment of the invention shown in FIG. 3, a blade portion, namely, the elastic element, the wiping element support track and the wiping element is curved so that pressure is applied from the blade portion to a windshield substantially equally and continuously along an entire length of the blade portion due to force applied from a wiper arm through attachments 112 to the elastic element. On the other hand, in the embodiment of the invention shown in FIG. 4, the blade portion 170, namely, the elastic element 140, the wiping element support track 150 and the wiping element 160 is curved so that pressure is applied from the blade portion 170 to a windshield due to force applied from a wiper arm through attachment 112' and claws 121, 122 to the elastic element 140 at four distinct points, namely the two pairs of claws 121 and 122 in the two secondary parts 120.

The two claws 121 and 122 are configured to receive and retain the elastic element 140, the wiping element support track 150 and the wiping element 160, and by having at least two secondary parts 120, at least four claws are provided to receive and retain the elastic element 140, the wiping element support track 150 and the wiping element 160 at predetermined intervals in the hybrid blade 100.

Each secondary part 120' has on its outboard end an opening 125 to accept an end stop 130. The primary part 110' and the secondary parts 120' are connected together using protrusions or hinges 126 formed in the secondary part 120' that engage into a portion in cavities 114 formed in the primary part 110'. This connection is enabled by a pivoting joint that allows a downward force applied to a center or a middle portion of the primary part 110' to be distributed to each of the claws 121, 122. Based on the protrusions or hinges 126, the primary part 110' and the secondary parts 120' are able to swivel relative to each other to a certain degree along its length. That is, primary part 110' and the secondary parts 120' are able accommodate a changing curvature of a surface of a windshield of an automobile due to the ability to swivel relative to each other based on pressure applied thereto against the windshield.

The hidden section 123 is formed in a beam-shape, and is configured to be received into one of the cavities 114 formed in the primary part 110. When the secondary part 120' and the primary part 110' are connected, the hidden section 123 is substantially surrounded in the primary part 110' at the cavity 114 while the exposed section 124' is exposed outside the primary part 110'. The hinge 126 is disposed transversely to the hidden section 123, and has a matching receiver in the cavity 114 of the primary part 110'. The hidden section 123 and the exposed section 124' thus form respective first end and second end of the secondary part 120'.

The opening 125 is formed vertically through an end of the secondary part 120' from a top to a bottom thereof, and has a corresponding cross sectional shape as the end stop 130. The end stop 130 includes a head 131 and a body 132. The head 131 extends horizontally and the body 132 extends vertically so that the head 131 and the body 132 are generally perpendicularly arranged with respect to each other, although other angles are within the scope of this disclosure.

The hybrid blade 100 further includes the elastic element 140, the wiping element support track 150 and the wiping element 160. The elastic element 140 is elastic, and is seated in the wiping element support track 150 using two upwards extending sides and protrusions that face each other along a top of each side of the wiping element support track 150. The lower portion of the wiping element support track 150 has two downwards facing sides and protrusions that face each other along a bottom of each side, forming a cavity to retain the wiping element 160. The elastic element 140 may be metal or other elastic material, including plastic. The wiping element support track 150 may be of similar or same material as the elastic element 140, including plastic. The wiping element 160 may be rubber or a similar material.

In both the embodiments of the invention shown in FIGS. 3 and 4, the attachment 112 includes inner extensions 117 formed in the interior of the attachment 112, and outer extensions 116 formed in the exterior of the attachments 112.

Figure 5:
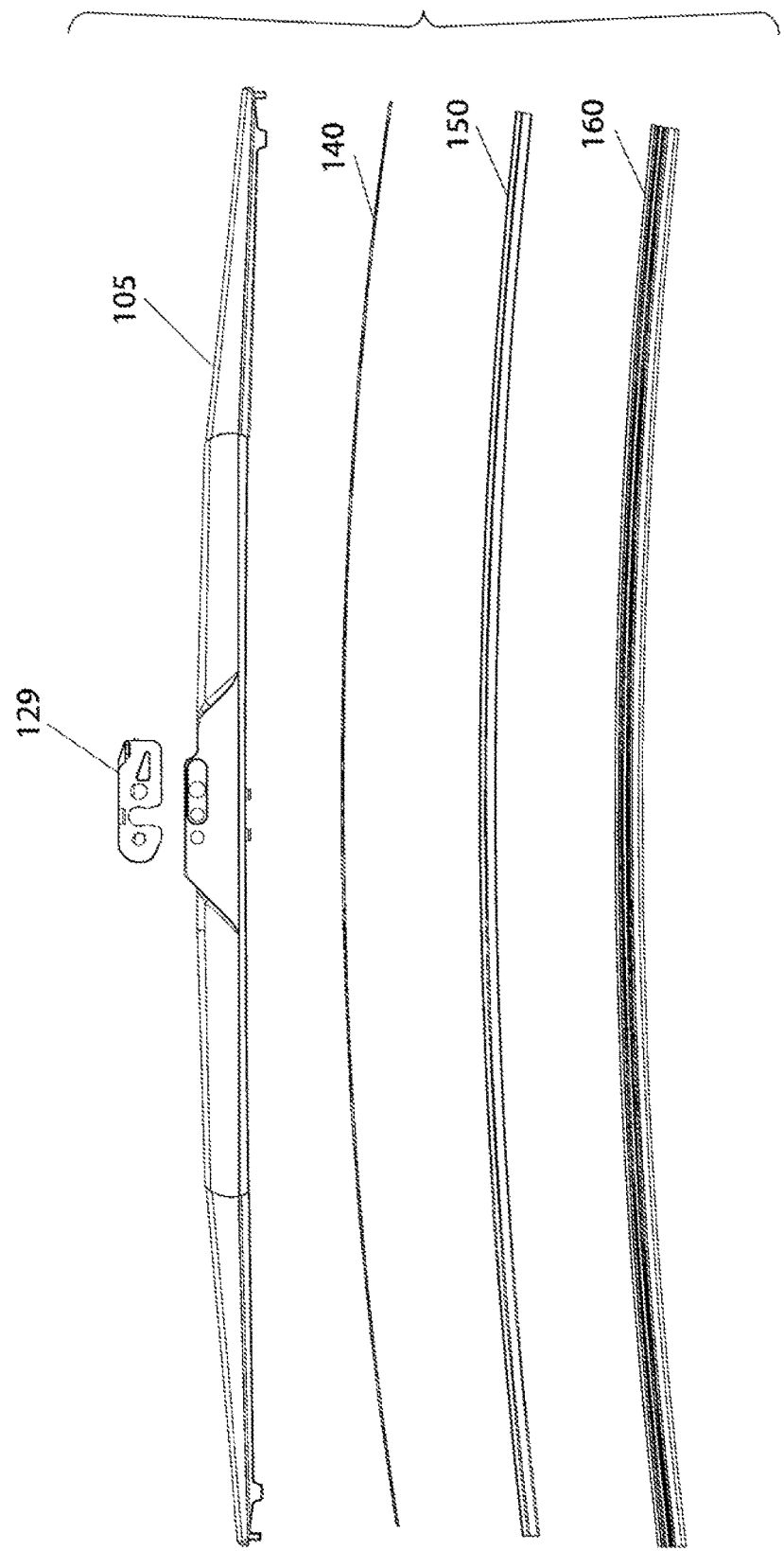
FIG. 5 shows a side exploded view of a windshield wiper blade according to one embodiment of the invention.

FIG. 5 shows a side exploded view of the windshield wiper blade according to one embodiment of the invention. In FIG. 5, the primary part 110', the at least two secondary parts 120', and the at least two end stops 130' are shown assembled, but the elastic element 140, the wiping element support track 150 and the wiping element 160 are shown separated. The primary part 110', the at least two secondary parts 120', and at least two end stops 130' are assembled into a blade shell part 105. Each of the elastic element 140, the wiping element support track 150 and the wiping element 160 may have similar lengths, but such is not required. The elastic element 140, the wiping element support track 150 and the wiping element 160 may have a predetermined curvature, which may be accommodated by the blade shell part 105. A bracket 129 may be received in the attachment 112. For example, the bracket 129 may engage with inner extensions 117 formed in the interior of the attachment 112 (see FIG. 4).

Figure 6:
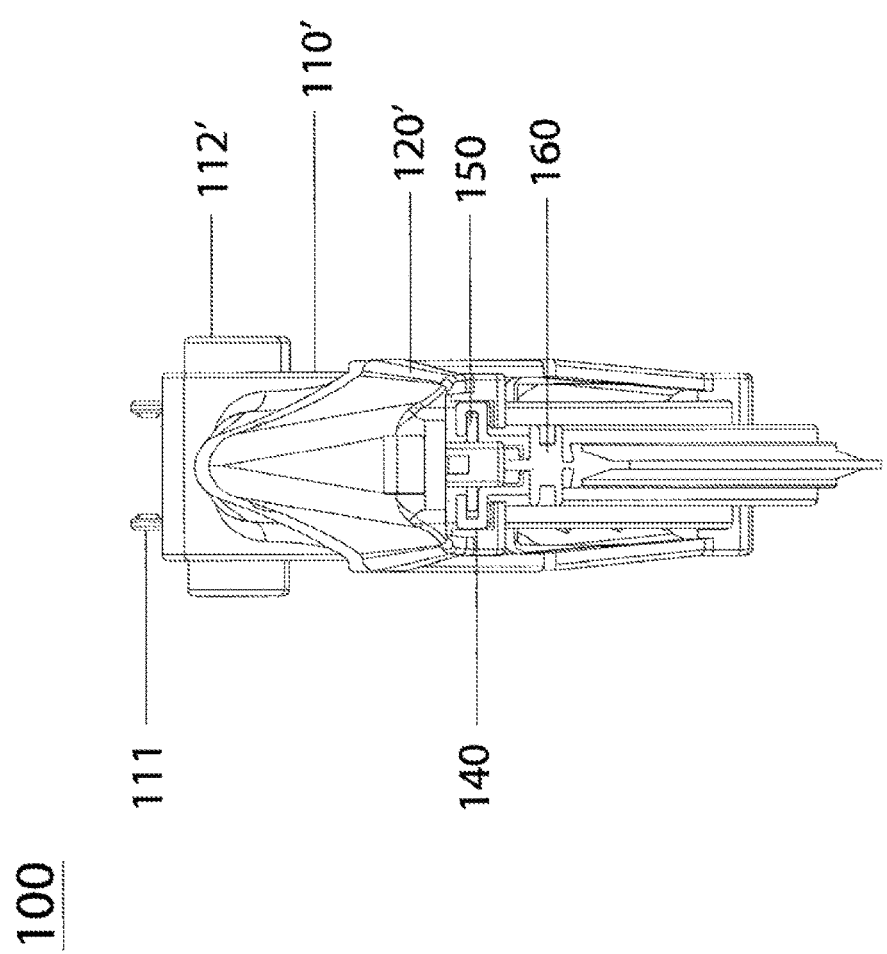
FIG. 6 shows a front elevational view of a windshield wiper blade according to one embodiment of the invention.

FIG. 6 shows a front elevational view of the windshield wiper blade according to one embodiment of the invention showing various elements from a tip of the wiping element 160 to a top of the attachment 112.

Figure 7:
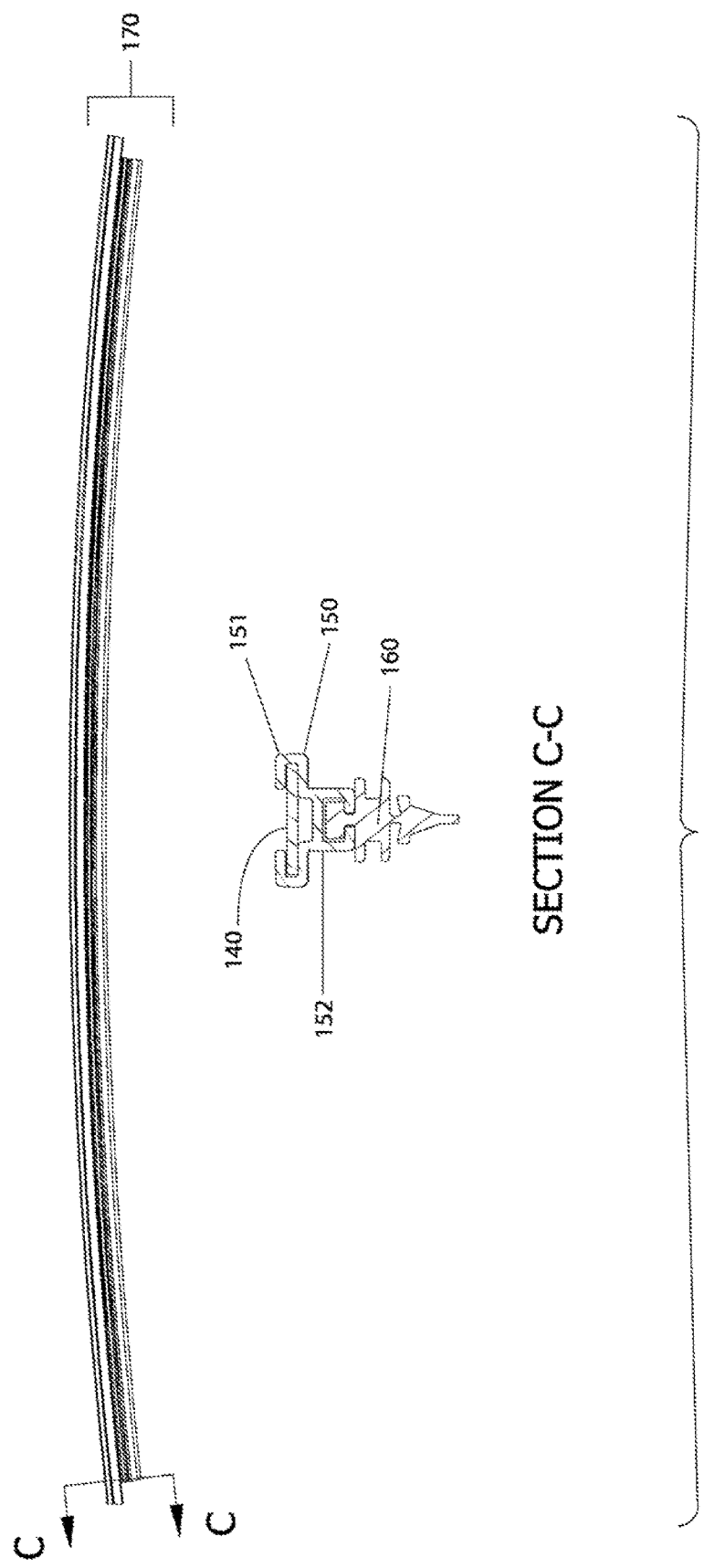
FIG. 7 shows a side elevational view and a cross sectional view of a blade portion of a windshield wiper blade according to one embodiment of the invention.

FIG. 7 shows a side elevational view and a cross sectional view of the blade portion 170 of the windshield wiper blade according to one embodiment of the invention. The blade portion 170 includes the elastic element 140, the wiping element support track 150 and the wiping element 160. As shown in FIG. 7, the wiping element support track 150 is disposed between the elastic element 140 and the wiping element 160, whereby the elastic element 140 is partially enclosed by first arms 151 of the wiping element support track 150, and the wiping element 160 is also partially enclosed by second arms 152 of the wiping element support track 150 at an opposite side of the wiping element support track 150 from the elastic element 140. In other words, the wiping element support track 150 receives both the elastic element 140 and the wiping element 160.

Figure 8:
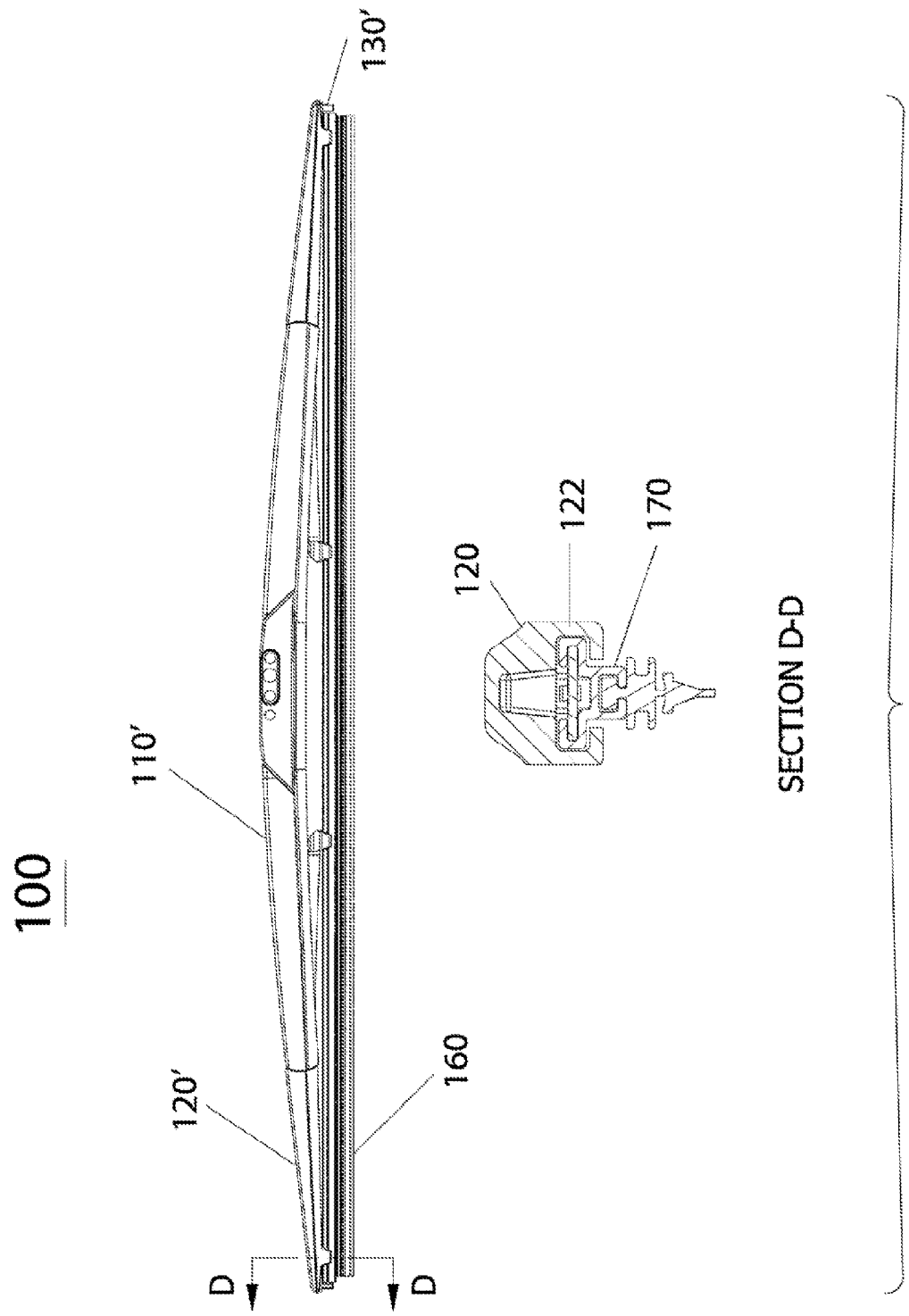
FIG. 8 shows a side elevational view and a cross sectional view of a windshield wiper blade according to one embodiment of the invention.

FIG. 8 shows a side elevational view and a corresponding cross sectional view of the hybrid blade according to one embodiment of the invention. As shown in FIG. 8, the cross sectional view of the hybrid blade 100 is taken at line D-D. The cross sectional view shows the secondary part 120, the claw 122, and the blade portion 170. The secondary part 120 receives and retains an end of the blade portion 170 via the claw 122.

Figure 9:
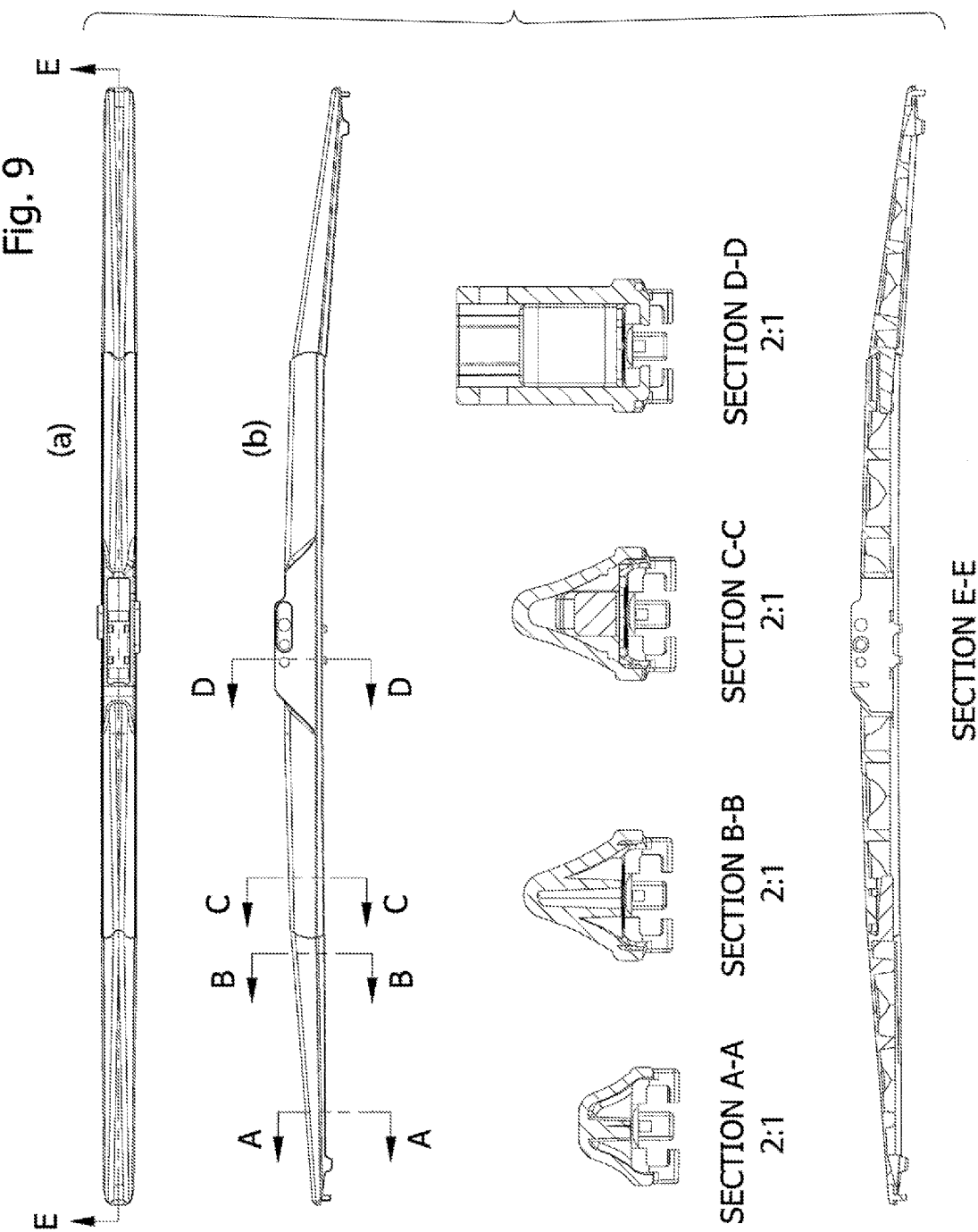
FIG. 9 shows various cross sectional views of a windshield wiper blade according to one embodiment of the invention.

FIG. 9 shows various cross sectional views of the windshield wiper blade according to one embodiment of the invention. As shown, (a) of FIG. 9 is a top view of the windshield wiper blade, and (b) of FIG. 9 includes various depictions of a side elevational view of the windshield wiper blade without the blade portion 170, as well as various cross sections of the windshield wiper blade. Namely, (b) of FIG. 9 shows cross sections A-A, B-B, C-C and D-D taken in the windshield wiper blade, as well as lengthwise section E-E taken in the windshield wiper blade. As shown, within the respective parts 110 and 120 are skeleton structures that provide bracing and support to the primary and secondary parts 110 and 120. These skeleton structures are generally truss-like, but such is not required, and any shaped structure may be used.

Figure 10:
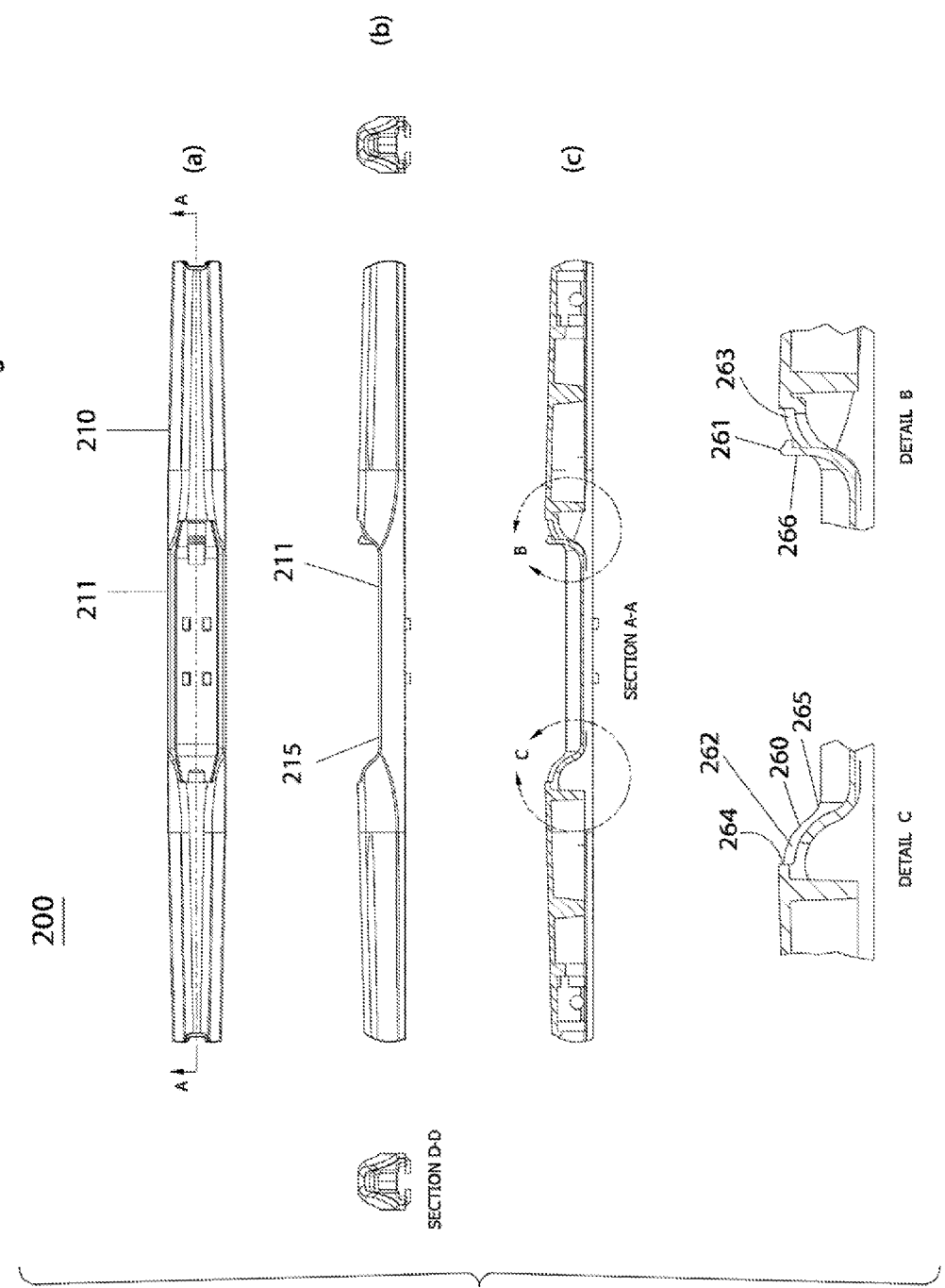
FIG. 10 shows views of a windshield wiper blade according to another embodiment of the invention.

FIG. 10 shows views of a windshield wiper blade according to another embodiment of the invention. In (a) of FIG. 10, shown is a top view of a primary part 210 of the windshield wiper blade 200. In (b) of FIG. 10, shown is a side elevational view of the primary part 210 with a cross-sectional view of line D-D from (a) of FIG. 10 (at left) and an end view (at right) thereof. In (c) of FIG. 10, shown is a lengthwise cross sectional view of line A-A from (a) of FIG. 10 with details of a notch 260 (detail C) and a lock 261 (detail B) of the recess 211. The recess 211 is formed in an intermediate portion of the primary part 210 and has a bottom portion 215 that is flat, and curved portions 262 and 263 at the notch 260 and the lock 261, respectively. Curvatures of the curved portions 262 and 263 are generally convex so as to protrude outward. In other embodiments of the invention, the portion of the primary part 210 having the curved portions 262 and 263 need not be convex, but may be other shapes, including straight, flat, or even concave. Also, the bottom portion 215 need not be flat, but may be curved, which may be convex or concave, or may be other shaped surfaces.

As shown in detail C of (c) of FIG. 10, the notch 262 has stops 264 and 265 that define the notch 262 that is recessed to receive one end of an insert (to be discussed below). Also, as shown in detail B of (c) of FIG. 10, the lock 261 includes a slender body 266 that extends from the bottom portion 215 upward. The lock 261 receives another end of the insert so that when the insert is engaged to both the notch 262 and the lock 261, the insert is retained in the recess 211 securely.

Figure 11:
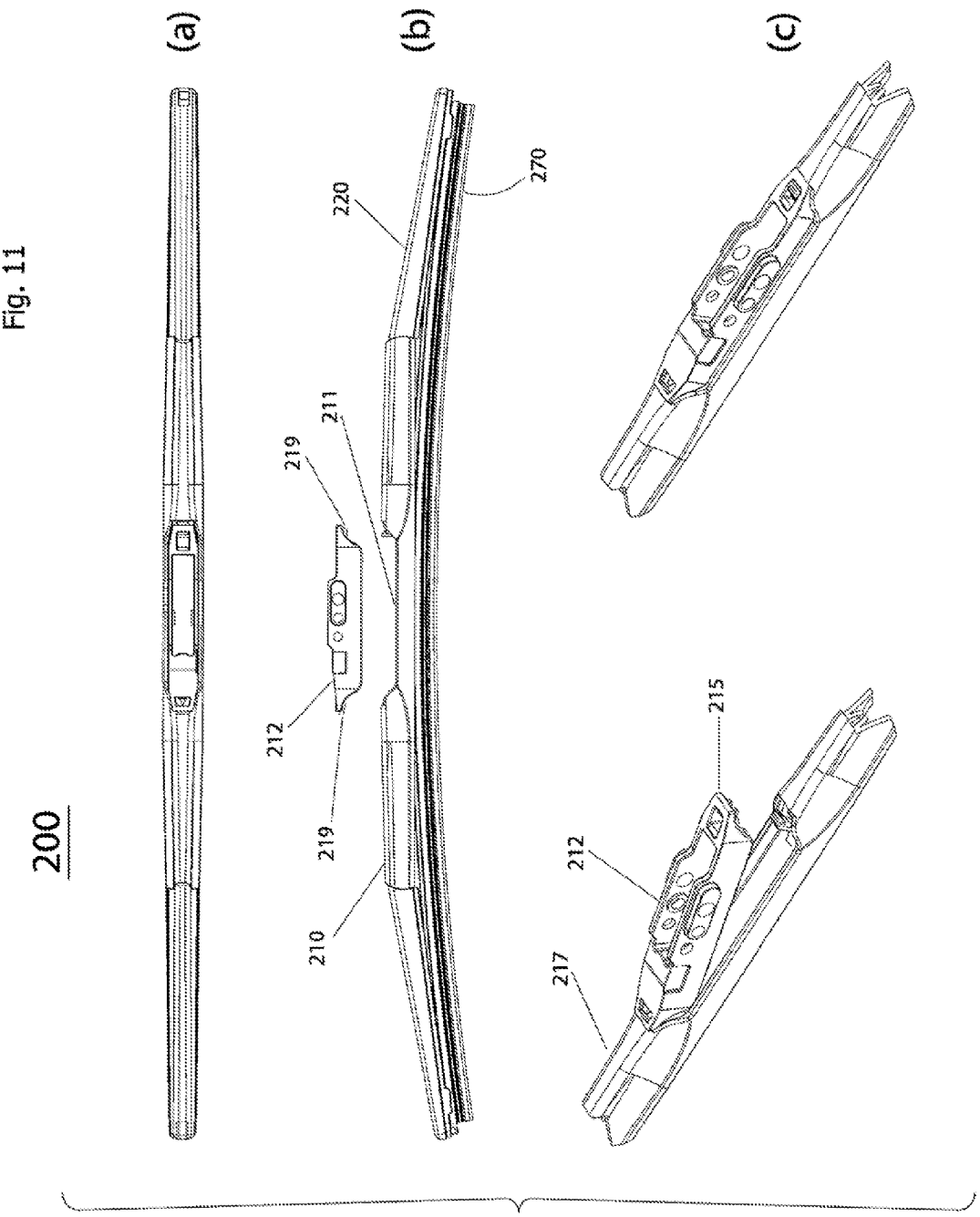
FIG. 11 shows views of a windshield wiper blade with a first insert according to another embodiment of the invention.

FIG. 11 shows views of the windshield wiper blade with a first insert. Particularly, (a) of FIG. 11 shows a top view of the windshield wiper blade 200 having a first insert 212, and (b) of FIG. 11 shows a partial exploded view of the windshield wiper blade 200 with the first insert 212 shown separated from the primary part 210. Shown in (b) of FIG. 11 are the primary part 210, secondary parts 220 and a blade portion 270. As the secondary part 220 and blade portion 270 are similar to the previously discussed primary part 110 and the blade portion 170, respectively, a detailed discussion thereof will not be repeated.

The primary part 210 may either have or lack a main claw that is similar to the main claw 115. Thus, in the embodiment of the invention with the primary part 210 having a main claw the blade portion 170 would function similarly to the embodiment shown in FIGS. 1-3. On the other hand, in an embodiment of the invention shown with the primary part 210 lacking a main claw, the blade portion 170 would function similarly to the embodiment shown in FIGS. 4-9. In other words, the windshield wiper blade 200 comes in several versions, namely, a version similar to the embodiment of the invention shown in FIG. 3, and a version similar to the embodiment of the invention shown in FIG. 4.

Figure 12:
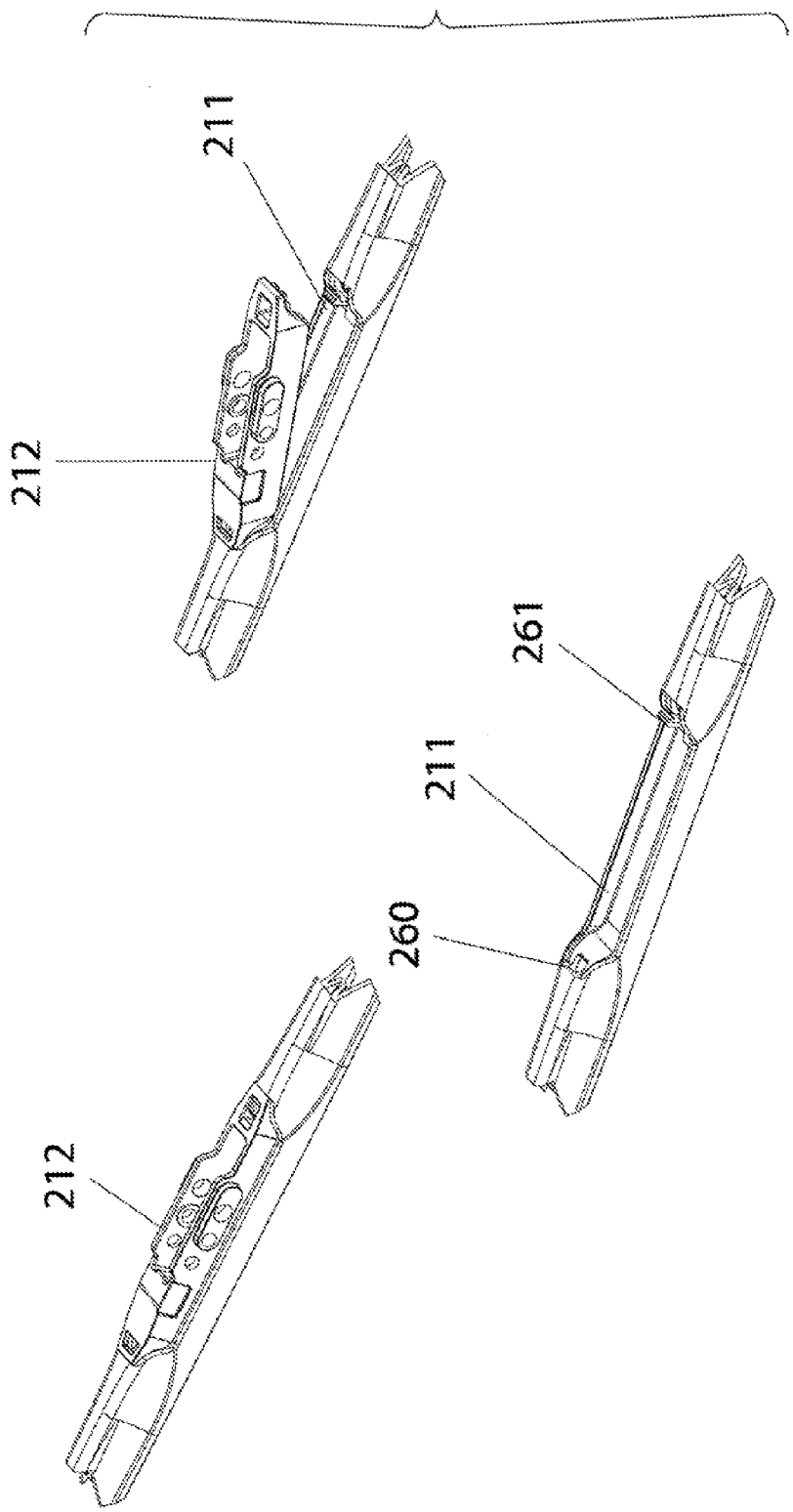
FIG. 12 shows views of an insertion method of a first insert according to one embodiment of the invention

Shown in (c) of FIG. 11 are views to first engage (No. 1) and then lock (No. 2) the first insert 212 in the recess 211 of the primary part 210. Particularly, the first insert 212 is brought close to the recess 211 to first engage a first end 217 of the first insert 212 in the notch 262. Then, a second end 215 of the first insert 212 is pressed against the lock 261 to enable the lock 261 to be engaged to the second end 215 through an aperture formed in the second end 215. Accordingly, respective first end 217 and second end 215 are engaged to the notch 262 and the lock 261 for securing attachment of the first insert 212 to the primary part 210 at the recess 211. To more securely attach the first insert 212 to the primary part 210, the first insert 212 has protrusions 219 at respective first and second ends 217 and 215 for engagement with corresponding structures formed in the recess 211. FIG. 12 shows views of insertion of the first insert 212.

Figure 13:
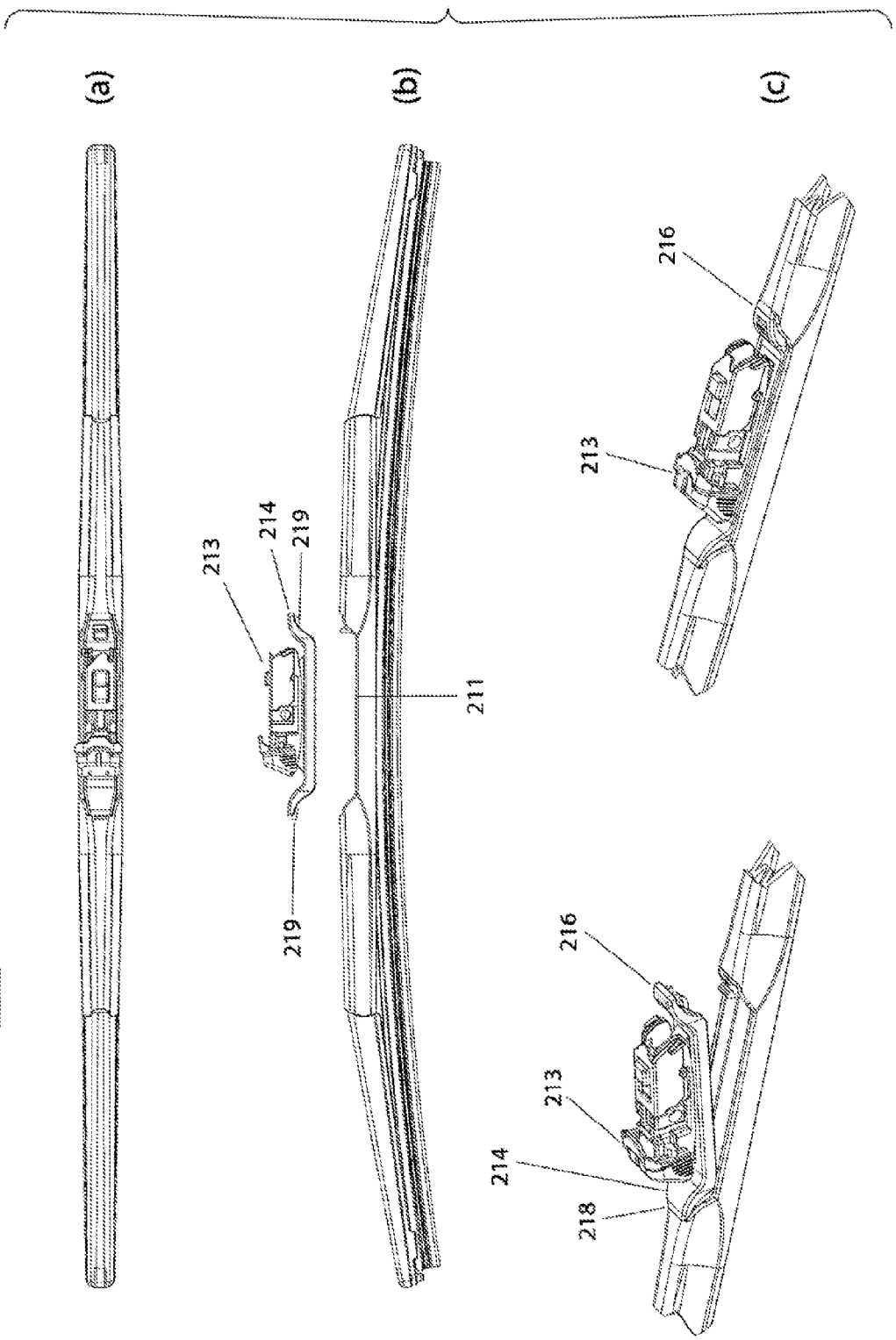
FIG. 13 shows views of a windshield wiper blade with a second insert according to another embodiment of the invention.

FIG. 13 shows views of the windshield wiper blade with a second insert 214. Particularly, (a) of FIG. 13 shows a top view of the windshield wiper blade 200 having an adapter 213 and a second insert 214, and (b) of FIG. 13 shows a partial exploded view of the windshield wiper blade 200 with the adapter 213 and the second insert 214 shown separated from the primary part 210. The adapter 213 is attached to the second insert 214, and the second insert 214 is in turn engaged to the primary part 210 in the recess 21.

Shown in (b) of FIG. 13 are the primary part 210, the secondary part 220 and the blade portion 270. As the secondary part 220 and blade portion 270 are similar to the previously discussed primary part 110 and the blade portion 170, respectively, a detailed discussion thereof will not be repeated. Shown in (c) of FIG. 13 are views to first engage (No. 1) and then lock (No. 2) the adapter 213 and the second insert 214 in the recess 211 of the primary part 210. Particularly, the second insert 214 is brought close to the recess 211 to first engage a first end 218 of the second insert 214 in the notch 262. Then, a second end 216 of the second insert 214 is pressed against the lock 261 to enable the lock 261 to be engaged to the second end 216 through an aperture formed in the second end 216. Accordingly, respective first end 218 and second end 216 are engaged to the notch 262 and the lock 261 for securing attachment of the second insert 214 to the primary part 210 at the recess 211. To more securely attach the second insert 214 to the primary part 210, the second insert 214 has protrusions 219 at respective first and second ends 218 and 216 for engagement with corresponding structures formed in the recess 211.

Figure 14:
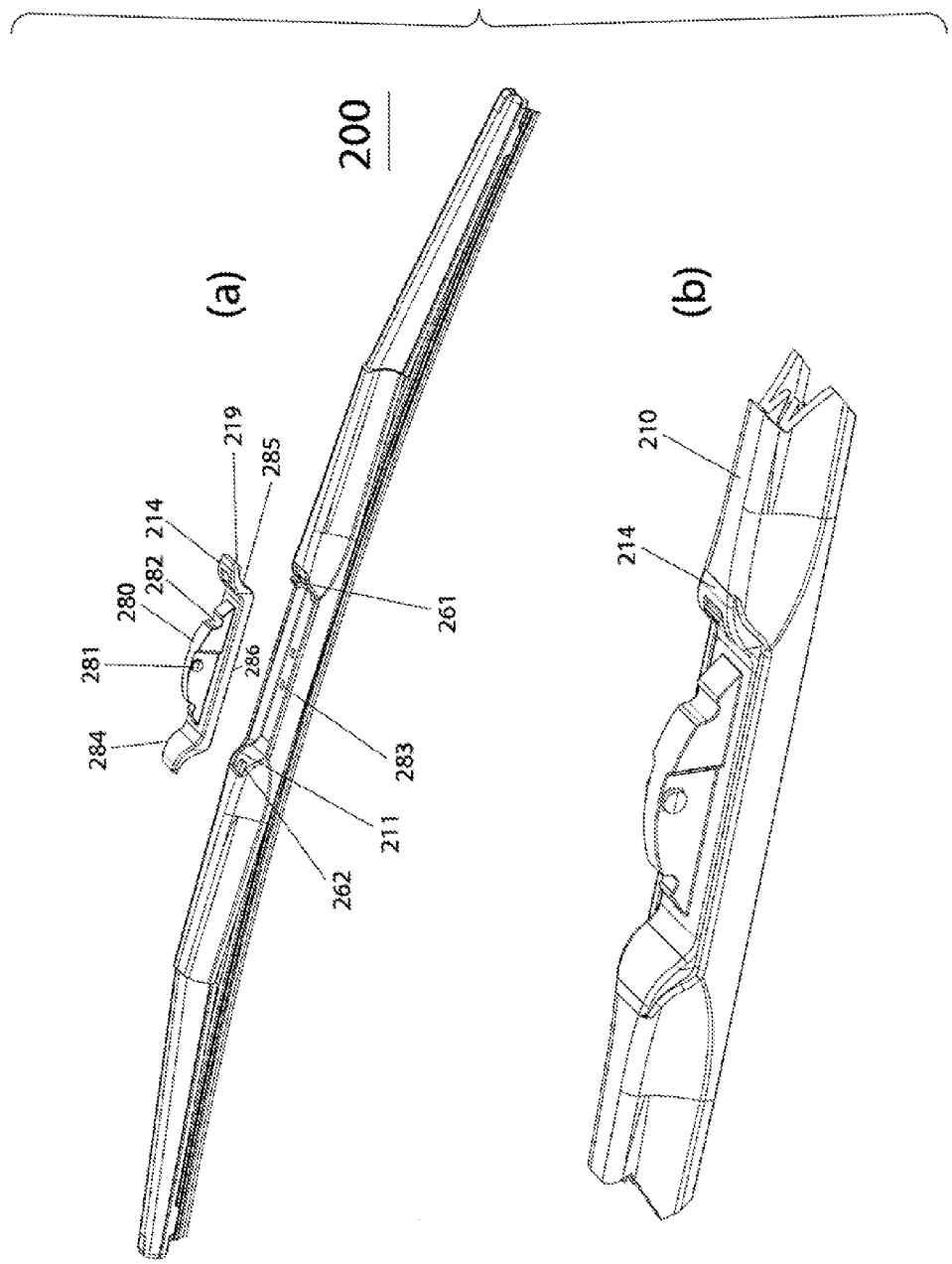
FIG. 14 shows a close up view of the second insert according to another embodiment of the invention.

FIG. 14 shows a close up view of the second insert according to another embodiment of the invention. In (a) of FIG. 14, details of the second insert 214 are shown, which includes a holder 280, a hinge 281, at least one recess 282, rises 284 and 285, a base 286, and at least one protrusion 219. Also, shown in FIG. 14 are the notch 262 and the lock 261 of the primary part 210 for the recess 211. In the recess 211 shown in FIG. 14 is at least one aperture 283 formed on a bottom or floor of the recess 211.

The holder 280 is generally formed in a length-wise direction of the primary part 210 or the hybrid blade 200, and rises from the base 286 of the second insert 214. The holder 280 is generally perpendicular to the base 286, which is generally flat. The holder 280 may have any outline, for example in FIG. 14, the holder 280 is shown having a curved outline having an apex near a top which is most distal from the base 286. Centered on the apex, the curved outline of the holder 280 is shown symmetrical in this embodiment of the invention. However, the outline of the holder 280 need not be curved or need not even be symmetrical in other embodiments of the invention.

The hinge 281 is formed near the top of the holder 280, for example, near the apex of the holder 280. The hinge 281 has opposite protrusions on each side of the holder 280 whereby the hinge 281 is disposed perpendicular to an extending direction of the holder 280. The hinge 281 may have a circular cross section as shown in FIG. 14, or may have other cross sectional shape.

The holder 280 includes at least one recess 282 formed in an intermediate portion of the holder 280, which forms a recess that breaks a smooth convex curvature of the outline of the holder 280. In FIG. 14, two recesses 282 are shown, but the number of the recesses 282 may vary. The holder 280 may have a preset thickness that is consistent from one side to another side of the holder 280. The two recesses 282 may be formed where claws of the primary part 210 is positioned.

The base 286 includes rises 284 and 285 that match the curvature of the curved portions 262 and 263 of the recess 211. The rises 284 and 285 are connected to the floor of the base 286, and each includes the protrusion 219 of the second insert 214. In (b) of FIG. 14, shown is the second insert 214 connected to the primary part 210.

Figure 15:
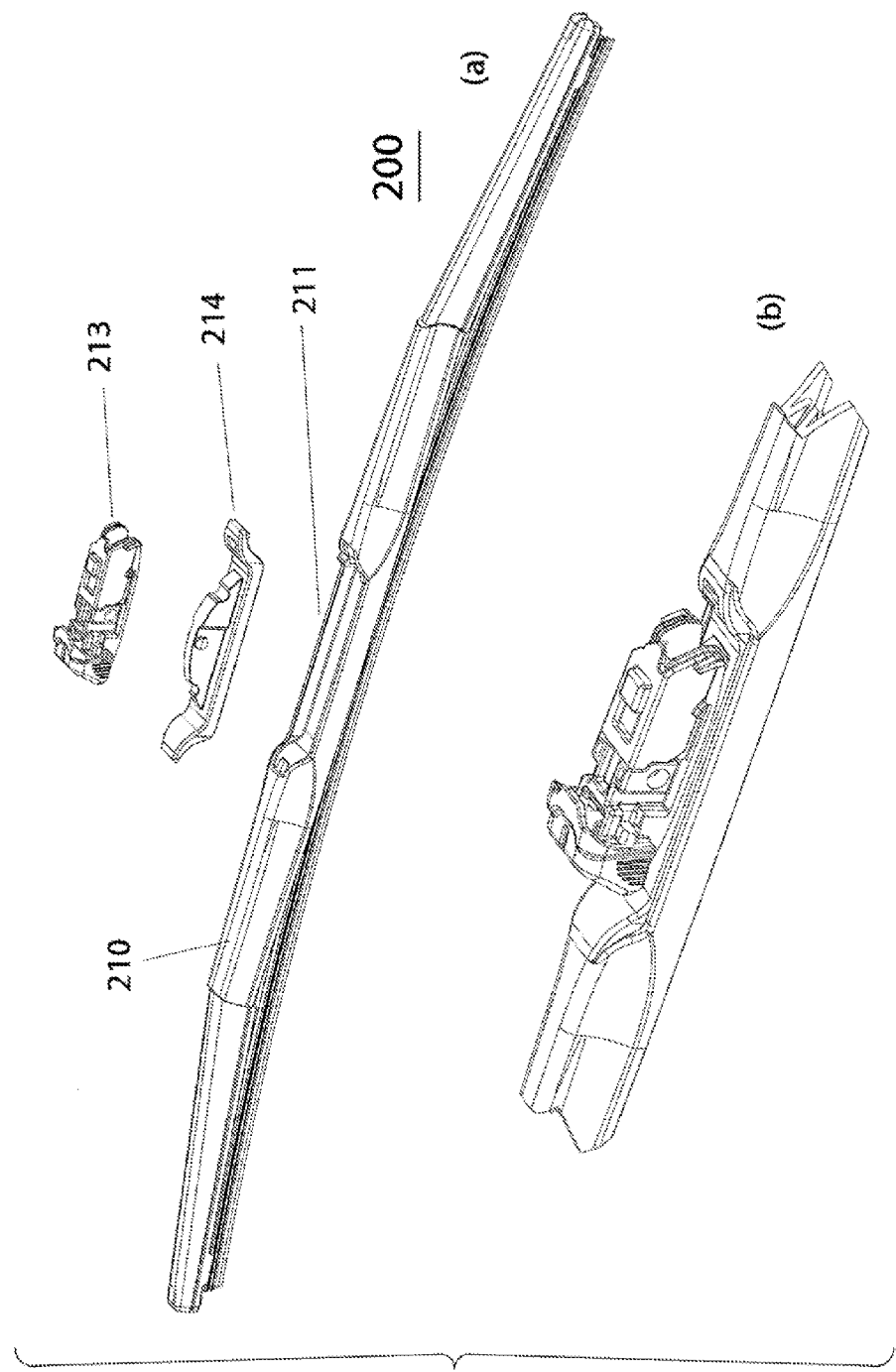
FIG. 15 shows a close up view of the second insert and an adapter according to another embodiment of the invention.

FIG. 15 shows a relationship of the adapter 213 to the second insert 214 according to another embodiment of the invention. In (a) of FIG. 15, shown is an exploded view of the primary part 210, the second insert 214 and the adapter 213. In (b) of FIG. 15, shown is an assemble view of the primary part 210, the second insert 214 and the adapter 213 seated on the second insert 214.

Figure 16:
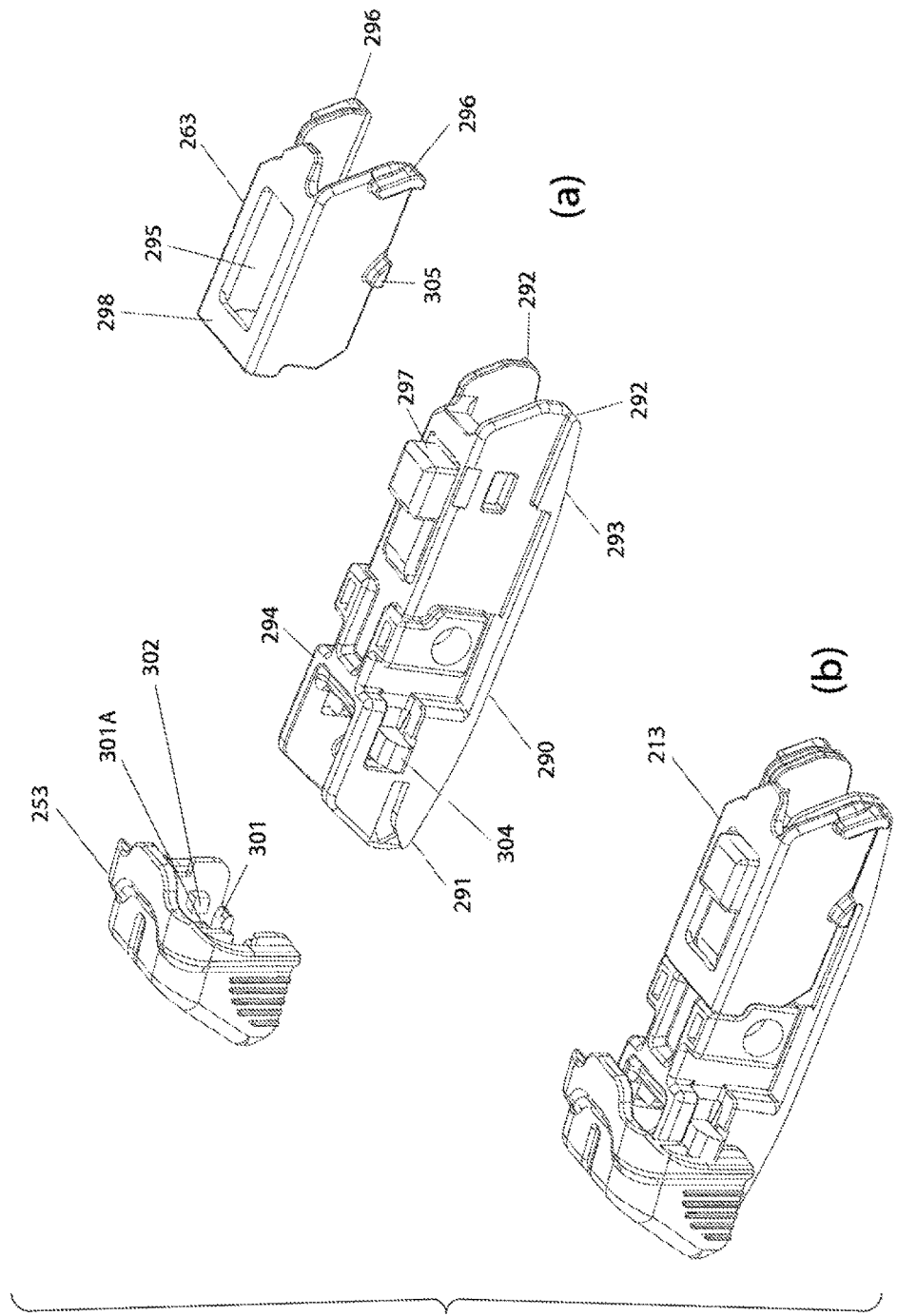
FIG. 16 shows an exploded view of the adapter according to another embodiment of the invention.

FIG. 16 shows an exploded view of the adapter 213. Specifically, as shown in (a) of FIG. 16, the adapter 213 includes a body 290, a cap 253 and a sleeve 263. The body 290 includes a head 291 at one end and a tail 293 at an opposite end. The body further includes two sides 292 and a connecting side 294, whereby the two sides 292 are generally parallel to each other and the connecting side 294 that extends generally perpendicular to both the two sides 292. The body 290 further includes a bump or protrusion 297 formed in an area of the tail 293. The body 290 includes a bias member 304 formed to extend inward in to a space defined partly by the connecting side 294. The body 290 also includes a rod 300 that extend across a hollow in the body 290 (see FIG. 17).

The cap 253 has a hollow interior, which is designed to receive the head 291 of the body 290. Once the cap 253 is attached to the head 291, the cap 253 is able to swivel as shown in (b) of FIG. 16 to secure an arm of a windshield that is attached to the body 290. A grabber having a lower fork 301 and an upper fork 301A is positioned in the interior of the cap 253. The lower fork 301 and the upper fork 301A are designed to engage and lock in the rod 300 to enable the cap 253 to swivel. A block 302 is also positioned in the interior of the cap 253.

The sleeve 263 has an open area bounded by two parallel walls 296 and a connection wall 298. The connection wall 298 is generally perpendicular to the two parallel walls 296. An aperture 295 is formed in the connection wall 298. The sleeve 263 is designed to receive the tail 293 of the body 290. Once the sleeve 263 is attached to the tail 293, the sleeve 263 provides attachment points for various arms of a windshield wiper arm that is additional to when the sleeve 263 is not present, or not used. Additionally, when the sleeve 263 is attached to the tail 293, the bump 297 aligns with the aperture 295, so that the bump 297 extends through the aperture 295. The sleeve 263 further includes an engagement member 305 that cooperate with the parallel walls 296 to receive and secure a predetermined type of arm.

Figure 17:
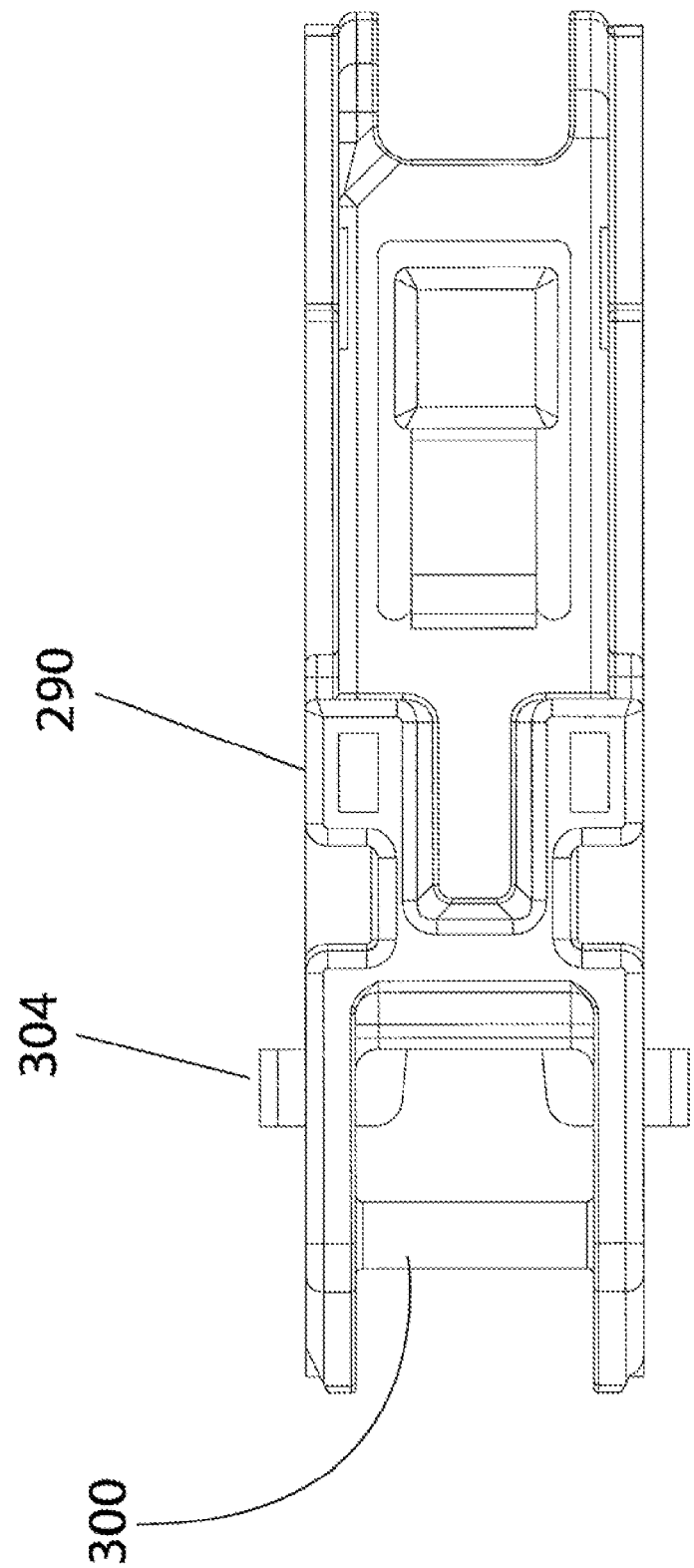
FIG. 17 shows a top plan view of a body of an adapter according to another embodiment of the invention.

FIG. 17 shows a top plan view of a body of an adapter according to another embodiment of the invention. The body 292 shows the rod 300 and the bias member 304.

Figure 18:
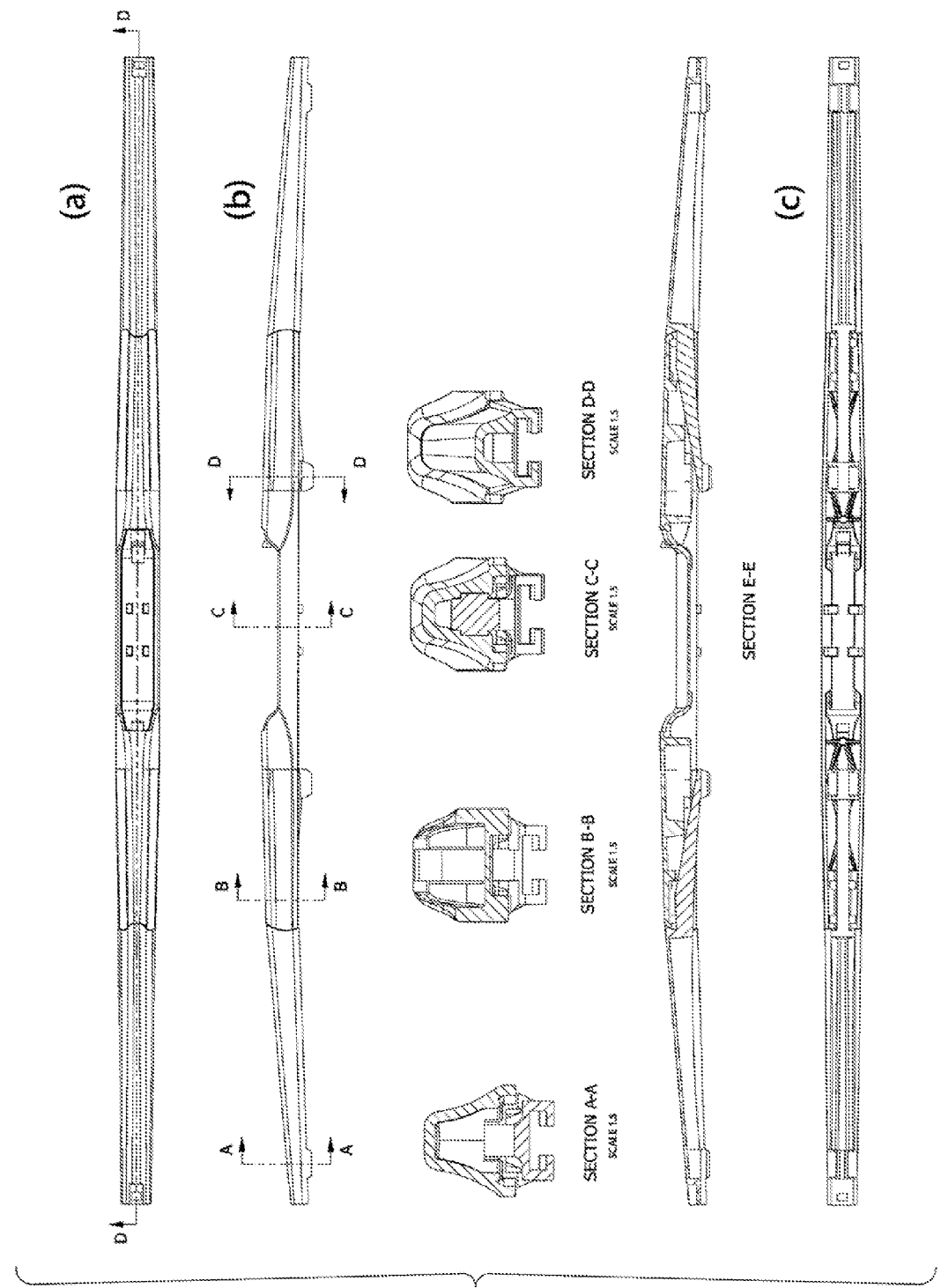
FIG. 18 shows various cross sectional views of a windshield wiper blade according to another embodiment of the invention.

FIG. 18 shows various cross sectional views of the windshield wiper blade according to another embodiment of the invention. As shown, (a) of FIG. 18 is a top view of the windshield wiper blade, and (b) of FIG. 18 includes various depictions of a side elevational view of the windshield wiper blade without the blade portion 270, as well as various cross sections of the windshield wiper blade. Namely, (b) of FIG. 18 shows cross sections A-A, B-B, C-C and D-D taken in the windshield wiper blade, as well as lengthwise section E-E taken in the windshield wiper blade. As shown, (c) of FIG. 17 shows a bottom view of the windshield wiper blade.

Figure 19:
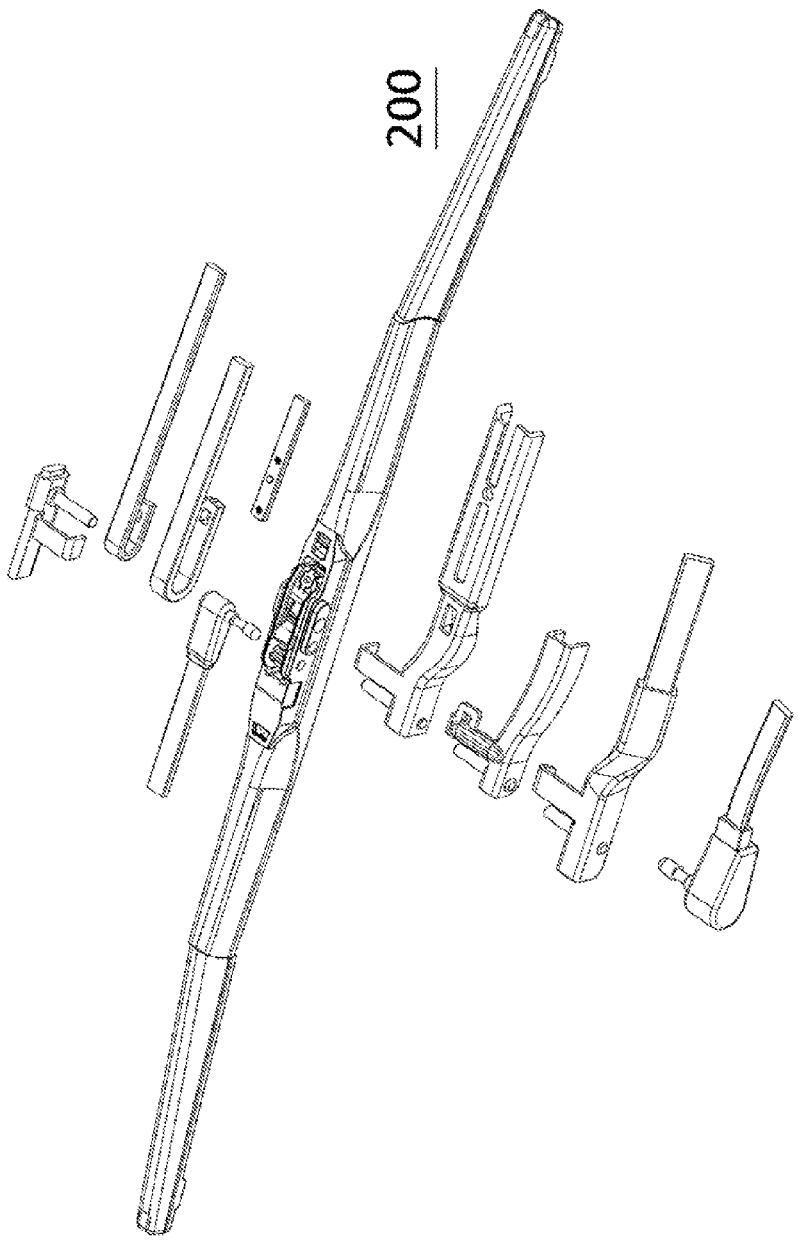
FIG. 19 shows various arms for use with a windshield wiper blade according to another embodiment of the invention.

FIG. 19 shows various arms for use with the windshield wiper blade according to embodiments of the invention. As shown in FIG. 19, usable with the windshield wiper blades are side pin type arms, BMW type arms, hook type arms, and bayonet type arms. These arms cooperate with the first insert 212.

Figure 20:
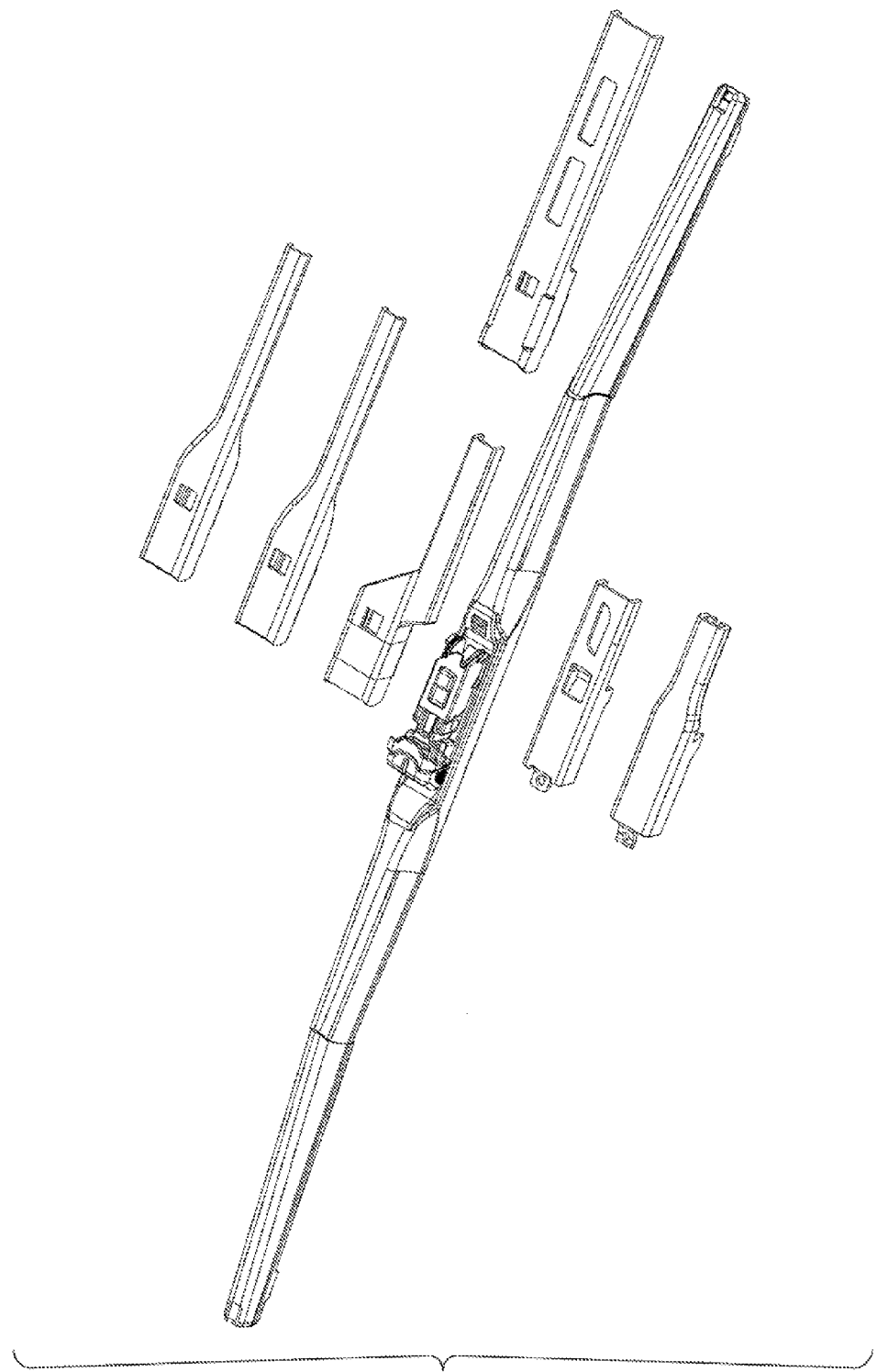
FIG. 20 shows HB 13 and 14 arms used with a windshield wiper blade according to another embodiment of the invention.

FIG. 20 shows HB 13 and 14 arms used with the windshield wiper blade according to embodiments of the invention. These arms work with the second insert 214 and the adapter 213. As noted, the sleeve 263 may be removed to accommodate some of the wiper arms.

Figure 21:
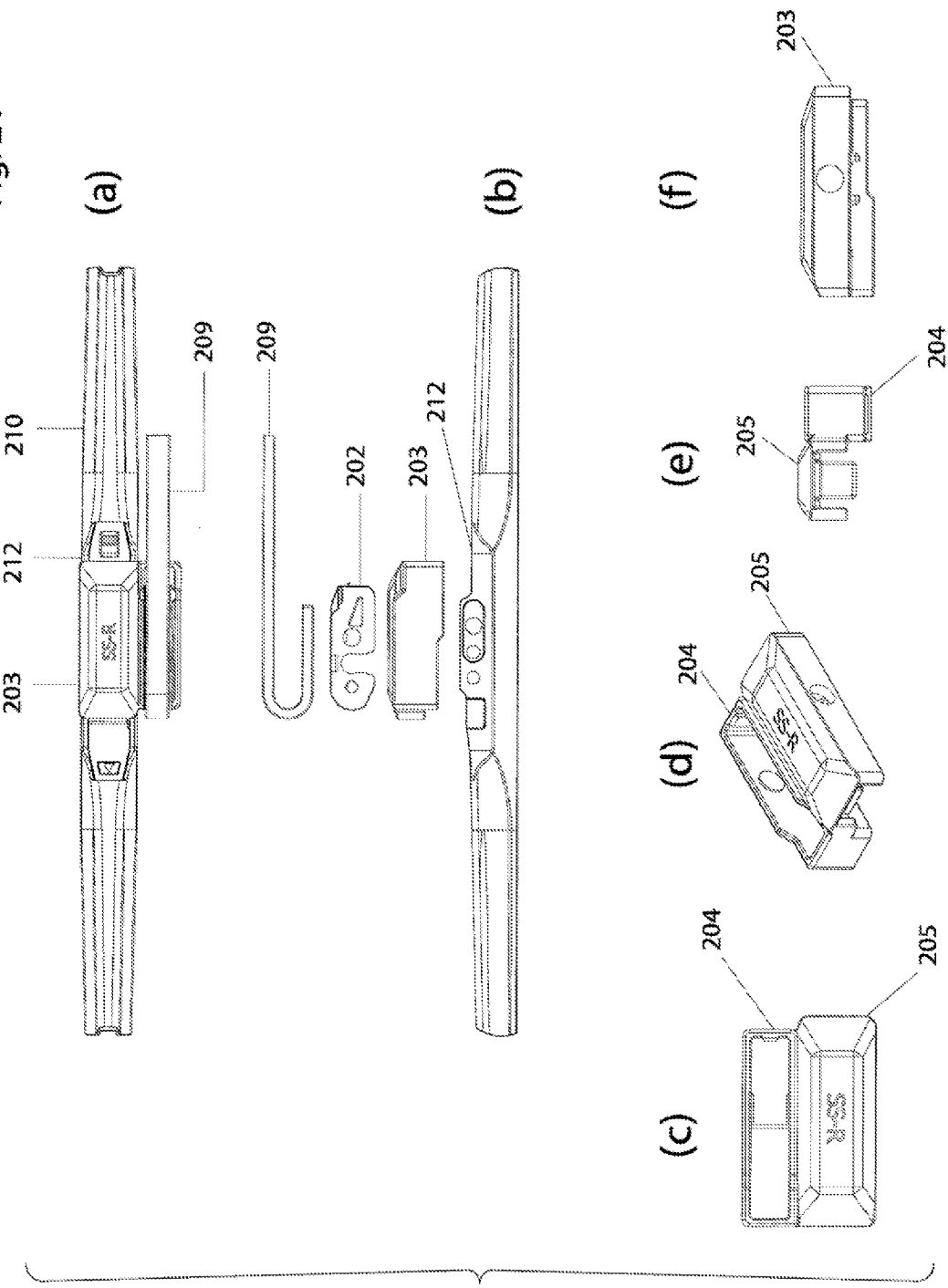
FIG. 21 shows views of a windshield wiper blade with an adapter, a side adapter, an arm and their assembly.

FIG. 21 shows views of a windshield wiper blade with an adapter, a side adapter, an arm and their assembly. In (a) of FIG. 21, shown is an assembled view of a primary part 210 having a first insert 212, a side adapter 203 engaged to the first insert 212, an adapter 202 engaged to the side adapter, and an arm 209 engaged to the side adapter 203 via the adapter 202. In (b) of FIG. 21, each of the first insert 212, the side adapter 203, the adapter 202 and the arm 209 are separately shown in an exploded view. In (c), (d), (e) and (f) of FIG. 21, the side adapter 203 is shown in various perspective and elevational views. As shown, the side adapter 203 includes an adapter box 204 and an adapter cover 205 disposed side-by-side. The adapter cover 205 is engaged to the first insert 212, and the attached adapter box 204 receives and accommodates the adapter 202 and the arm 209.

The side adapter 203 comes in two versions that are mirror images of each other, namely a version for a right-side driving configuration and a version for a left-side driving configuration.

FIG. 22 shows views of a windshield wiper blade with an adapter, a side adapter and their assembly in right-side and left-side driving configurations. In (a) of FIG. 22, shown is a side adapter 206 for a left-side driving configuration, and in (b) of FIG. 22, shown is a side adapter 203 for a right-side driving configuration.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed:

1. An adapter for connecting a windshield wiper to a windshield wiper arm, the adapter comprising:
   a body having a head at one end thereof and a tail at an opposite end thereof, the body having two spaced parallel sides, and the body including a rod extending between the two spaced parallel sides;
   a cap having a pair of opposed sides to define a hollow interior to receive the head of the body such that the two spaced parallel sides fit therein, the cap being swivably connected to the rod so as to swivel with respect to the body by a grabber configured to engage the rod; and
   a sleeve configured to receive the tail of the body, and configured to be detachable from the body,
   wherein the grabber includes:
   an upper fork member; and
   a lower fork member spaced from the upper fork member.

2. The adapter according to claim 1, wherein the body includes a connecting side extending between the two parallel sides.

3. The adapter according to claim 1, wherein the sleeve includes a pair of parallel walls and a connection wall extending between the pair of parallel walls.

4. The adapter according to claim 3, wherein the body includes a protrusion, and
   wherein the connection wall includes an aperture configured to allow the protrusion to extend therethrough when the sleeve is attached to the body.

5. The adapter according to claim 1, wherein the body includes an engagement member configured to cooperate with a surface of a wiper arm.

6. The adaptor according to claim 1, wherein the body includes a bias member extending outward from the spaced parallel sides.

7. The adaptor according to claim 6, wherein the bias member is located between the rod and the tail of the body.

* * * * *